(12) United States Patent
Gao et al.

(10) Patent No.: US 9,942,916 B2
(45) Date of Patent: Apr. 10, 2018

(54) UPLINK CONTROL INFORMATION TRANSMISSION METHOD AND DEVICE

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 125 days.

(21) Appl. No.: 14/905,826

(22) PCT Filed: Jul. 22, 2014

(86) PCT No.: PCT/CN2014/082723
§ 371 (c)(1),
(2) Date: Jan. 18, 2016

(87) PCT Pub. No.: WO2015/010602
PCT Pub. Date: Jan. 29, 2015

(65) Prior Publication Data
US 2016/0165631 A1    Jun. 9, 2016

(30) Foreign Application Priority Data
Jul. 23, 2013    (CN) .......................... 2013 1 0311881

(51) Int. Cl.
*H04W 4/00*    (2009.01)
*H04W 72/12*    (2009.01)
(Continued)

(52) U.S. Cl.
CPC ......... *H04W 72/1284* (2013.01); *H04L 5/001* (2013.01); *H04L 5/0023* (2013.01);
(Continued)

(58) Field of Classification Search
CPC .......... H04W 56/001; H04W 56/0005; H04W 72/0406
See application file for complete search history.

(56) References Cited

U.S. PATENT DOCUMENTS

2008/0267165 A1   10/2008   Bertrand et al.
2011/0051633 A1*   3/2011   Pan ................... H04W 56/0045
                                                                370/280
(Continued)

FOREIGN PATENT DOCUMENTS

CN    101753202 A    6/2010
CN    101997659 A    3/2011
(Continued)

OTHER PUBLICATIONS

Supplementary European Search Report for EP14829376 dated May 17, 2016, 11 pages.
(Continued)

Primary Examiner — Charles C Jiang
Assistant Examiner — Ryan Kavleski
(74) Attorney, Agent, or Firm — Kilpatrick Townsend & Stockton LLP

(57) ABSTRACT

Disclosed are an uplink control information transmission method and device for addressing a lack of a solution that a terminal provides feedback of downlink carriers scheduled by different base stations in a dual-connectivity scenario. The method in an embodiment of the present application comprises: a terminal receives data over a first carrier and a second carrier, the data over the first carrier being scheduled by a first base station and the data over the second carrier being scheduled by a second base station; the terminal generates first uplink control information for the first carrier, and/or the terminal generates second uplink control information for the second carrier; the terminal transmits the generated uplink control information over one uplink carrier
(Continued)

according to a TA value and a reference carrier, the uplink control information comprising at least one of the first uplink control information and the second uplink control information. Therefore, the terminal can simply transmit over one uplink carrier the uplink control information corresponding to the downlink carriers scheduled by different base stations scheduling data for the terminal.

20 Claims, 3 Drawing Sheets

(51) Int. Cl.
    *H04L 5/00*     (2006.01)
    *H04W 74/08*     (2009.01)
    *H04W 76/02*     (2009.01)
    *H04L 1/00*     (2006.01)

(52) U.S. Cl.
    CPC .......... *H04L 5/0032* (2013.01); *H04L 5/0053* (2013.01); *H04L 5/0087* (2013.01); *H04W 74/0833* (2013.01); *H04W 76/025* (2013.01); *H04L 2001/0097* (2013.01)

(56) References Cited

U.S. PATENT DOCUMENTS

| | | | | |
|---|---|---|---|---|
| 2011/0243111 A1* | 10/2011 | Andgart | ............ | H04W 56/0045 370/338 |
| 2012/0063302 A1* | 3/2012 | Damnjanovic | ... | H04W 56/0045 370/228 |
| 2012/0163305 A1* | 6/2012 | Nimbalker | ........ | H04W 52/0206 370/329 |
| 2013/0028192 A1 | 1/2013 | Cheng et al. | | |
| 2013/0039231 A1 | 2/2013 | Wang | | |
| 2013/0114574 A1 | 5/2013 | Ng et al. | | |
| 2013/0188473 A1* | 7/2013 | Dinan | ............... | H04W 56/0005 370/216 |
| 2015/0131569 A1* | 5/2015 | Rosa | .................... | H04L 1/0026 370/329 |
| 2015/0223231 A1* | 8/2015 | Noh | ..................... | H04L 5/0048 370/329 |

FOREIGN PATENT DOCUMENTS

| | | |
|---|---|---|
| CN | 102111886 A | 6/2011 |
| CN | 102572967 A | 7/2012 |
| CN | 102656831 A | 9/2012 |
| EP | 2 760 242 A2 | 7/2014 |
| JP | 2013516917 A | 5/2013 |
| WO | 2011/085200 A1 | 7/2011 |
| WO | 2013/042980 A2 | 3/2013 |
| WO | 2013035974 A1 | 3/2013 |

OTHER PUBLICATIONS

Intel Corporation, "Discussion on RAN2 LS—timing advance calculation using time difference measurements", 3GPP TSG-RAN WG1#66 R1-112216, 7 pages, Aug. 22-26, 2011.
Intel Corporation, "Challenges in the uplink to support dual connectivity", 3GPP TSG RAN WG2 Meeting #82, R2-131986, Discussion and Decision, Fukuoka, Japan, May 20-25, 2013, 7 pages.
Alcatei-Lucent, Alcatei-Lucent Shanghai Bell, "Discussion on dual connectivity and requirements", 3GFP TSG RAN WG2 Meeting #81, R2-130520, Discussion and Decision, St. Julian's, Malta, Jan. 28 to Feb. 1, 2013, 4 pages.
Huawei, HiSilicon, "Feasible scenarios and benefits of dual connectivity in small cell deployment", 3GPP TSG-RAN WG2 Meeting #81, R2-130225, Discussion and Decision, St Julian's, Mafta, Jan. 28-Feb. 1, 2013, 9 pages.
NEC Group: "Some Evaluation Results on Different Multi-carrier Deployment Scenarios for Small Cells", 3GPP Draft; R1-131268, 3rd Generation Partnership Project (3GPP), Mobile Competence Centre ; 650, Route Des Lucioles ; F-06921 Sophia-Antipolis Cedex ; France, vol. RAN WG1 , No. Chicago, USA; Apr. 15, 2013-Apr. 19, 2013 Apr. 5, 2013 (Apr. 5, 2013), 6 pages.
QUALCOMM Incorporated: "Air interface considerations for dual connectivity", 3GPP Draft; R2-131159 Small Cell Air Interface Considerations, 3rd Generation Partnership Project (3GPP), Mobile Competence Centre ; 650, Route Des Lucioles ; F-06921 Sophia-Antipolis Cedex; France, vol. RAN WG2, No. Chicago, USA; Apr. 15, 2013-Apr. 19, 2013 Apr. 4, 2013 (Apr. 4, 2013), 4 pages.
International Search Report of PCT/CN2014/082723.
Office Action dated Jul. 17, 2015 in the counterpart Taiwan Application (103125209).

* cited by examiner

US 9,942,916 B2

UPLINK CONTROL INFORMATION TRANSMISSION METHOD AND DEVICE

This application is a US National Stage of International Application No. PCT/CN2014/082723 filed on Jul. 22, 2014, designating the United States and claiming the priority to Chinese Patent Application No. 201310311881.4, filed with the State Intellectual Property Office of People's Republic of China on Jul. 23, 2013 and entitled "Uplink control information transmission method and device", the content of which is hereby incorporated by reference in its entirety.

FIELD

The present invention relates to the field of communications and particularly to a method and device for transmitting uplink control information.

BACKGROUND

Along with the technical evolvement and emerging data services, such a scenario may occur in later releases of the Long Term Evolution-Advance (LTE-A) system that a user equipment is configured to operate while being served by a plurality of base stations (i.e., dual connectivity).

For example, a user equipment is configured with a Master Evolved NodeB (MeNB) and at least one Secondary base station (SeNB), where in the dual connectivity application scenario, at least an S1-MME (wherein MME stands for a Mobility Management Entity (MME), and S1 stands for an S1 interface to the MME) is terminated at the MeNB, so from the prospective of a core network, the MeNB can be regarded as a mobile anchor; and the SeNB is responsible for providing the user equipment with additional radio resources in addition to the MeNB.

In the dual connectivity scenario, frame structures applied to cells and/or carriers scheduled by different base stations may or may not be the same. For example, a Frequency Division Duplex (FDD) frame structure is used on the respective carriers scheduled by the different base stations for the user equipment; or a Time Division Duplex (TDD) frame structure is used on the respective carriers scheduled by the different base stations for the user equipment (wherein TDD uplink/downlink configurations applied to the respective carriers scheduled by the different base stations may or may not be the same); or an FDD frame structure is used on respective carriers in one frequency band for the user equipment, and a TDD frame structure is used on respective carriers in another frequency band for the user equipment.

In the dual connectivity scenario, the plurality of base stations which the user equipment is connected schedule their respective sets of downlink carriers separately, where data can be scheduled and transmitted for the user equipment in the following three options:

Option 1: bearers of the MeNB are routed directly to the MeNB from a gateway (e.g., a Serving Gateway (S-GW)); and bearers of the SeNB are routed directly to the SeNB from the gateway, that is, the bearers of the SeNB are not routed through the MeNB, as illustrated in FIG. 1;

Option 2: bearers of the MeNB are routed directly to the MeNB from a gateway; and firstly bearers of the SeNB are routed to the MeNB from the gateway, and then all the bearers are split by the MeNB to the SeNB, that is, the bearers of the SeNB are not split, as illustrated in FIG. 2; and Option 3: bearers of the MeNB are routed directly to the MeNB from a gateway; and firstly bearers of the SeNB are routed to the MeNB from the gateway, and then a part of the bearers are split by the MeNB to the SeNB, whereas the other part of the bearers are still transmitted at the MeNB side, that is, the bearers of the SeNB are split, as illustrated in FIG. 3.

In the dual connectivity scenario, the user equipment may receive data on the sets of downlink carriers scheduled by the different base stations, so the user equipment needs to feed back Uplink Control Information (UCI) corresponding to the downlink carriers scheduled by the different base stations. However in the dual connectivity scenario, a solution to making a feedback by the user equipment for the downlink carriers scheduled by the different base stations has been absent so far.

SUMMARY

Embodiments of the invention provide a method and device for transmitting uplink control information so as to address such a problem that a solution to making a feedback by a user equipment for downlink carriers scheduled by different base stations in a dual connectivity scenario has been absent so far.

An embodiment of the invention provides a method for transmitting uplink control information, the method comprising:

receiving, by a user equipment, data on a first carrier, and receiving data on a second carrier, wherein the data on the first carrier are scheduled by a first base station, and the data on the second carrier are scheduled by a second base station;

generating, by the user equipment, first uplink control information for the first carrier and/or generating, by the user equipment, second uplink control information for the second carrier; and transmitting, by the user equipment, the uplink control information generated by the user equipment, including at least one of the first uplink control information and the second uplink control information, on one uplink carrier according to a preconfigured Timing Advance (TA) value, and a predefined or preconfigured reference carrier for obtaining uplink transmission time of the user equipment.

With the solution according to the embodiment of the invention, the user equipment can transmit uplink control information corresponding to downlink carriers scheduled by the different base stations scheduling data for the user equipment, on the only one uplink carrier, so that the user equipment can feed back the uplink control information in a timely manner while lowering the cost of the user equipment.

In a preferred embodiment, transmitting, by the user equipment, the uplink control information on the one uplink carrier according to the TA value and the reference carrier includes:

determining, by the user equipment, the uplink transmission time of the user equipment according to a preconfigured TA value, and a predefined or preconfigured reference carrier for obtaining the uplink transmission time; and transmitting, by the user equipment, the uplink control information at the uplink transmission time on the one uplink carrier.

In this embodiment, obtaining, by the user equipment, the TA value and/or the reference carrier includes:

receiving, by the user equipment, configuration information transmitted by the first base station, and obtaining the TA value and/or the reference carrier; or receiving, by the user equipment, configuration information transmitted by the second base station, and obtaining the TA value and/or the reference carrier; or receiving, by the user equipment, configuration information transmitted by a predefined base station other than the first base station and the second base station, and obtaining the TA value and/or the reference carrier; or receiving, by the user equipment, configuration information transmitted by a base station scheduling a primary component carrier of the user equipment, and obtaining the TA value and/or the reference carrier; or receiving, by the user equipment, configuration information transmitted by a base station scheduling the one uplink carrier, and obtaining the TA value and/or the reference carrier; or receiving, by the user equipment, configuration information transmitted by a base station scheduling transmission of a Physical Uplink Shared Channel (PUSCH) and/or transmission of a Sounding Reference Symbol (SRS) on the one uplink carrier, and obtaining the TA value and/or the reference carrier; or receiving, by the user equipment, configuration information transmitted by a base station scheduling transmission of a PUSCH and/or transmission of a SRS in the current uplink sub-frame, or an uplink sub-frame adjacent to the current sub-frame, on the one uplink carrier, and obtaining the TA value and/or the reference carrier.

In this embodiment, the TA value is:

a first TA value of the user equipment relative to the first base station; or a TA value obtained by compensating a first TA value of the user equipment relative to the first base station, with respect to a target base station which is a predefined or preconfigured base station other than the first base station; or a second TA value of the user equipment relative to the second base station; or a TA value obtained by compensating a second TA value of the user equipment relative to the second base station, with respect to a target base station which is a predefined or preconfigured base station other than the second base station; or a TA value of the user equipment relative to a predefined base station other than the first base station and the second base station; or a TA value obtained by compensating a TA value of the user equipment relative to a predefined or preconfigured base station other than the first base station and the second base station, with respect to a target base station which is a predefined or preconfigured base station other than the present base station; or a TA value of the user equipment relative to a base station scheduling a downlink primary component carrier of the user equipment; or a TA value of the user equipment relative to the base station scheduling the one uplink carrier; or a TA value for the user equipment to transmit a PUSCH and/or a SRS on the one uplink carrier; or a TA value for the user equipment to transmit a PUSCH and/or an SRS in the current uplink sub-frame, or an uplink sub-frame adjacent to the current frame, on the one uplink carrier; or the average of TA values of the user equipment relative to the respective base stations scheduling data for the user equipment, wherein the average is predetermined by the respective base stations and notified by one of the respective base stations to the user equipment, or is determined by one of the respective base stations and notified by the base station to the user equipment and the other base stations among the respective base stations; or one of TA values of the user equipment relative to the respective base stations scheduling data for the user equipment, wherein the TA value is predetermined by the respective base stations and notified by one of the respective base stations to the user equipment, or is determined by one of the respective base stations and notified by the base station to the user equipment and the other base stations among the respective base stations; or a TA value obtained with a predefined optimization method based on TA values of the user equipment relative to the respective base stations scheduling data for the user equipment, wherein the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations.

In this embodiment, the reference carrier is:

one of downlink carriers scheduled by the first base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

In another preferred embodiment, transmitting, by the user equipment, the first uplink control information on the one uplink carrier according to the TA value and the reference carrier includes: using, by the user equipment, a first TA value preconfigured to the user equipment as a TA value for transmitting the first uplink control information, wherein the first TA value is a TA value of the user equipment relative to the first base station, using one of downlink carriers scheduled by the first base station or a downlink primary component carrier of the user equipment or a downlink carrier paired with the one uplink carrier as the reference carrier for obtaining the uplink transmission time of the user equipment, determining uplink transmission time at which the first uplink control information is transmitted, according to the first TA value and the reference carrier, and transmitting the first uplink control information at the determined uplink transmission time on the one uplink carrier; and transmitting, by the user equipment, the second uplink control information on the one uplink carrier according to the TA value and the reference carrier includes: using, by the user equipment, a second TA value preconfigured to the user equipment as a TA value for transmitting the second uplink control information, wherein the second TA value is a TA value of the user equipment relative to the second base station, using one of downlink carriers scheduled by the second base station or the downlink primary component carrier of the user equipment or the downlink carrier paired with the one uplink carrier as the reference carrier for obtaining the uplink transmission time of the user equipment, determining uplink transmission time at which the second uplink control information is transmitted, according to the second TA value and the reference carrier, and transmitting the second uplink control information at the determined uplink transmission time on the one uplink carrier.

Preferably further to this embodiment, the user equipment needs to transmit the first uplink control information and the second uplink control information in different uplink sub-frames.

In the two preferred embodiments above, obtaining, by the user equipment, the first TA value includes:

obtaining, by the user equipment, the first TA value configured by the first base station to the user equipment, wherein the first TA value is determined by the first base station according to a received Physical Random Access Channel (PRACH) and/or measurement signal transmitted by the user equipment on the one uplink carrier; or obtaining, by the user equipment, the first TA value configured by the second base station to the user equipment, wherein the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or obtaining, by the user equipment, the first TA value configured by a predefined or preconfigured base station other than the first base station and the second base station to the user equipment, wherein the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

In the two preferred embodiments above, obtaining, by the user equipment, the second TA value includes:

obtaining, by the user equipment, the second TA value configured by the second base station to the user equipment, wherein the second TA value is determined by the second base station according to a received PRACH and/or measurement signal transmitted by the user equipment on the one uplink carrier; or obtaining, by the user equipment, the second TA value configured by the first base station to the user equipment, wherein the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or obtaining, by the user equipment, the second TA value configured by a predefined or preconfigured base station other than the first base station and the second base station to the user equipment, wherein the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In an embodiment, the method further comprises:

compensating, by the first base station, with respect to the second base station the TA value determined by the first base station according to the received PRACH and/or measurement signal transmitted by the user equipment on the one uplink carrier, according to at least one of a relative position, a frequency characteristic, and a transmission delay, between the first base station and the second base station; and/or compensating, by the second base station, with respect to the first base station the TA value determined by the second base station according to the received PRACH and/or measurement signal transmitted by the user equipment on the one uplink carrier, according to at least one of a relative position, a frequency characteristic, and a transmission delay, between the second base station and the first base station; and/or compensating, by the predefined or preconfigured base station, with respect to the first base station or the second base station the TA value determined by the predefined or preconfigured base station according to the received PRACH and/or measurement signal transmitted by the user equipment on the one uplink carrier, according to at least one of a relative position, a frequency characteristic, and a transmission delay, between the predefined or preconfigured base station and the first base station or the second base station.

In the first preferred embodiment, transmitting, by the user equipment, the uplink control information on the one uplink carrier includes:

transmitting, by the user equipment, a plurality of uplink channels on which the uplink control information is carried, using the same TA value in the same uplink sub-frame on the one uplink carrier, wherein uplink control information corresponding to downlink carriers scheduled by the different base stations is carried on the different uplink channels for transmission; or transmitting, by the user equipment, at least one uplink channel on which the uplink control information is carried, and at least one uplink channel and/or SRS on and/or in which other information is carried, using the same TA value in the same uplink sub-frame on the one uplink carrier, wherein uplink control information corresponding to downlink carriers scheduled by the different base stations is carried on the same uplink channel for transmission or carried respectively on different uplink channels for transmission;

wherein the uplink channel includes a Physical Uplink Control Channel (PUCCH) and a PUSCH.

In the second preferred embodiment, transmitting, by the user equipment, the uplink control information on the one uplink carrier includes:

transmitting, by the user equipment, uplink control information corresponding to downlink carriers scheduled by the different base stations, respectively using different TA values in different uplink sub-frames on the one uplink carrier, wherein the uplink channel includes a Physical Uplink Control Channel (PUCCH) and a PUSCH.

In an embodiment of the invention, the uplink control information includes at least one of Acknowledgment (ACK)/Negative Acknowledgement (NACK) feedback information, Channel State Information (CSI) feedback information, and Scheduling Request (SR) information;

wherein the CSI feedback information includes at least one of a Channel Quality Indicator (CQI), a Pre-coding Matrix Indicator (PMI), a Rank Indication (RI), and a Pre-coding Type Indicator (PTI).

In an embodiment of the invention, the first base station is a Master evolved NodeB (MeNB), and the second base station is a Secondary evolved NodeB (SeNB); or the first base station is an SeNB, and the second base station is an MeNB; or the first base station is a base station of a macro cell, and the second base station is a base station of a small cell; or the first base station is a base station of a small cell, and the second base station is a base station of a macro cell; or the first base station is a base station serving a Primary Component Carrier (PCC) of the user equipment, and the second base station is a base station serving at least one Secondary Component Carriers (SCCs) of the user equipment.

In an embodiment of the invention, the one uplink carrier is:

only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

An embodiment of the invention further provides a method for receiving uplink control information, the method comprising:

transmitting, by a first base station, data for a user equipment on a first carrier, wherein the user equipment is configured with the first carrier and a second carrier, the data on the first carrier are scheduled by the first base station, and data on the second carrier are scheduled by a second base station; and receiving, by the first base station, uplink control information transmitted by the user equipment, on one uplink carrier according to a TA value for the user equipment to transmit the uplink control information, and a reference carrier for obtaining uplink transmission time of the user equipment, wherein the uplink control information includes at least first uplink control information generated by the user equipment for the first carrier, and the one uplink carrier is used for transmitting uplink control information corresponding to the respective base stations scheduling data for the user equipment.

With the solution according to the embodiment of the invention, the different base stations scheduling data for the user equipment can receive the uplink control information generated by the user equipment for downlink carriers scheduled by the different base stations scheduling data for the user equipment, on the one uplink carrier, so that the uplink control information can be fed back in a timely manner while lowering the cost of the user equipment.

In an embodiment, receiving, by the first base station, the uplink control information transmitted by the user equipment, on one uplink carrier according to the TA value and the reference carrier includes:

determining, by the first base station, the TA value for the user equipment to transmit the uplink control information, and the reference carrier for obtaining the uplink transmission time of the user equipment;

determining, by the first base station, a reception time window according to the TA value and the reference carrier; and receiving, by the first base station, the uplink control information in the reception time window on the one uplink carrier.

In an embodiment, determining, by the first base station, the TA value for the user equipment to transmit the uplink control information includes:

determining, by the first base station, the TA value according to a received Physical Random Access Channel (PRACH) and/or measurement signal transmitted by the user equipment on the one uplink carrier; or obtaining, by the first base station, the TA value by compensating a TA value determined according to a received PRACH and/or measurement signal transmitted by the user equipment on the one uplink carrier, with respect to a target base station which is a predefined or preconfigured base station other than the first base station; or obtaining, by the first base station, the TA value according to received information transmitted by any other base station scheduling data for the user equipment than the present base station, wherein the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the first base station; or the TA value is a TA value determined by the other base station according to a predetermined rule, wherein the other base station includes at least the second base station, a base station scheduling a downlink primary component carrier of the user equipment, a base station scheduling the one uplink carrier, a base station triggering transmission of a Physical Uplink Shared Channel (PUSCH) and/or transmission of a Sounding Reference Symbol (SRS) on the one uplink carrier, and a base station triggering transmission of a PUSCH and/or transmission of an SRS, in the current uplink sub-frame, or an uplink sub-frame adjacent to the current sub-frame, on the one uplink carrier; or determining, by the first base station, the TA value according to a predetermined rule;

wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

Furthermore the method further comprises:

compensating, by the first base station, with respect to the target base station the TA value determined by the first base station according to the received PRACH and/or measurement signal transmitted by the user equipment on the one uplink carrier, according to at least one of a relative position, a frequency characteristic, and a transmission delay, between the first base station and the corresponding target base station; and/or compensating, by the other base station, with respect to the target base station the TA value determined by the other base station, according to the received PRACH and/or measurement signal transmitted by the user equipment on the one uplink carrier according to at least one of a relative position, a frequency characteristic, and a transmission delay, between the other base station and the corresponding target base station.

Preferably before the first base station receives the uplink control information transmitted by the user equipment, on the one uplink carrier, the method further includes:

notifying, by the first base station, the user equipment of the determined TA value for the user equipment to transmit the uplink control information; and/or notifying, by the first base station, the other base stations scheduling data for the user equipment than the present base station, of the determined TA value for the user equipment to transmit the uplink control information.

In an embodiment, the reference carrier is:

one of downlink carriers scheduled by the first base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS, in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

Preferably before the first base station receives the uplink control information transmitted by the user equipment, on the one uplink carrier, the method further includes:

notifying, by the first base station, the user equipment of the determined reference carrier for the user equipment to transmit the uplink control information; and/or notifying, by the first base station, the other base stations scheduling data for the user equipment than the present base station, of the determined reference carrier for the user equipment to transmit the uplink control information.

In an embodiment of the invention, the first base station and the second base station receive the same uplink channel on which the uplink control information is carried, respectively in their respective determined reception time windows in the same uplink sub-frame on the one uplink carrier, wherein the uplink control information includes at least the first uplink control information and the second uplink control information; or the first base station receives an uplink channel on which the first uplink control information is carried, and the second base station receives an uplink channel on which the second uplink control information is carried, respectively in their respective determined reception time windows in the same uplink sub-frame on the one uplink carrier, wherein the uplink channel on which the first uplink control information is carried is different from the uplink channel on which the second uplink control information is carried; or the first base station receives an uplink channel on which the first uplink control information is carried, and the second base station receives an uplink channel on which the second uplink control information is carried, respectively in their respective determined reception time windows in different uplink sub-frames on the one uplink carrier.

In an embodiment of the invention, the uplink control information includes at least one of Acknowledgment (ACK)/Negative Acknowledgement (NACK) feedback information, Channel State Information (CSI) feedback information, and Scheduling Request (SR) information;

wherein the CSI feedback information includes at least one of a Channel Quality Indicator (CQI), a Pre-coding Matrix Indicator (PMI), a Rank Indication (RI), and a Pre-coding Type Indicator (PTI).

In an embodiment of the invention, the first base station is a Master evolved NodeB (MeNB), and the second base station is a Secondary evolved NodeB (SeNB); or the first base station is an SeNB, and the second base station is an MeNB; or the first base station is a base station of a macro cell, and the second base station is a base station of a small cell; or the first base station is a base station of a small cell, and the second base station is a base station of a macro cell; or the first base station is a base station serving a Primary Component Carrier (PCC) of the user equipment, and the second base station is a base station serving at least one Secondary Component Carriers (SCCs) of the user equipment.

In an embodiment of the invention, the one uplink carrier is:

only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

An embodiment of the invention provides a user equipment comprising:

a receiving module configured to receive data on a first carrier, and to receive data on a second carrier, wherein the data on the first carrier are scheduled by a first base station, and the data on the second carrier are scheduled by a second base station;

a processing module configured to generate first uplink control information for the first carrier and/or to generate second uplink control information for the second carrier; and a transmitting module configured to transmit the uplink control information generated by the processing module, including at least one of the first uplink control information and the second uplink control information, on one uplink carrier according to a preconfigured Timing Advance (TA) value, and a predefined or preconfigured reference carrier for obtaining uplink transmission time of the user equipment.

In a preferred embodiment, the transmitting module is further configured:

to determine uplink transmission time according to a preconfigured TA value, and a predefined or preconfigured reference carrier for obtaining the uplink transmission time; and to transmit the uplink control information at the uplink transmission time on the one uplink carrier.

In this embodiment, the transmitting module configured to obtain the TA value and/or the reference carrier is configured:

to receive configuration information transmitted by the first base station, and to obtain the TA value and/or the reference carrier; or to receive configuration information transmitted by the second base station, and to obtain the TA value and/or the reference carrier; or to receive configuration information transmitted by a predefined base station other than the first base station and the second base station, and to obtain the TA value and/or the reference carrier; or to receive configuration information transmitted by a base station scheduling a primary component carrier of the user equipment, and to obtain the TA value and/or the reference carrier; or to receive configuration information transmitted by a base station scheduling the one uplink carrier, and to obtain the TA value and/or the reference carrier; or to receive configuration information transmitted by a base station scheduling transmission of a PUSCH and/or transmission of an SRS on the one uplink carrier, and to obtain the TA value and/or the reference carrier; or to receive configuration information transmitted by a base station scheduling transmission of a PUSCH and/or transmission of an SRS in the current uplink sub-frame, or an uplink sub-frame adjacent to the current sub-frame, on the one uplink carrier, and to obtain the TA value and/or the reference carrier.

In this embodiment, the TA value is:

a first TA value of the user equipment relative to the first base station; or a TA value obtained by compensating a first TA value of the user equipment relative to the first base station, with respect to a target base station which is a predefined or preconfigured base station other than the first base station; or a second TA value of the user equipment relative to the second base station; or a TA value obtained by compensating a second TA value of the user equipment relative to the second base station, with respect to a target base station which is a predefined or preconfigured base station other than the second base station; or a TA value of the user equipment relative to a predefined base station other than the first base station and the second base station; or a TA value obtained by compensating a TA value of the user equipment relative to a predefined or preconfigured base station other than the first base station and the second base station, with respect to a target base station which is a predefined or preconfigured base station other than the present base station; or a TA value of the user equipment relative to a base station scheduling a downlink primary component carrier of the user equipment; or a TA value of the user equipment relative to the base station scheduling the one uplink carrier; or a TA value for the user equipment to transmit a PUSCH and/or an SRS on the one uplink carrier; or a TA value for the user equipment to transmit a PUSCH and/or an SRS in the current uplink sub-frame, or an uplink sub-frame adjacent to the current frame, on the one uplink carrier; or the average of TA values of the user equipment relative to the respective base stations scheduling data for the user equipment, wherein the average is predetermined by the respective base stations and notified by one of the respective base stations to the user equipment, or is determined by one of the respective base stations and notified by the base station to the user equipment and the other base stations among the respective base stations; or one of TA values of the user equipment relative to the respective base stations scheduling data for the user equipment, wherein the TA value is predetermined by the respective base stations and notified by one of the respective base stations to the user equipment, or is determined by one of the respective base stations and notified by the base station to the user equipment and the other base stations among the respective base stations; or a TA value obtained with a predefined optimization method based on TA values of the user equipment relative to the respective base stations scheduling data for the user equipment, wherein the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations.

In this embodiment, the reference carrier is:

one of downlink carriers scheduled by the first base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

In another preferred embodiment of the invention, the transmitting module is configured:

to use a preconfigured first TA value as a TA value for transmitting the first uplink control information, wherein the first TA value is a TA value of the user equipment relative to the first base station, to use one of downlink carriers scheduled by the first base station or a downlink primary component carrier of the user equipment or a downlink carrier paired with the one uplink carrier as the reference carrier for obtaining the uplink transmission time, to determine uplink transmission time at which the first uplink control information is transmitted, according to the first TA value and the reference carrier, and to transmit the first uplink control information at the determined uplink transmission time on the one uplink carrier; and to use a preconfigured second TA value as a TA value for transmitting the second uplink control information, wherein the second TA value is a TA value of the user equipment relative to the second base station, to use one of downlink carriers scheduled by the second base station or the downlink primary component carrier of the user equipment or the downlink carrier paired with the one uplink carrier as the reference carrier for obtaining the uplink transmission time of the user equipment, to determine uplink transmission time at which the second uplink control information is transmitted, according to the second TA value and the reference carrier, and to transmit the second uplink control information at the determined uplink transmission time on the one uplink carrier.

In the two preferred embodiments above, the transmitting module configured to obtain the first TA value is configured:

to obtain the first TA value configured by the first base station to the user equipment, through the receiving module, wherein the first TA value is determined by the first base station according to a received Physical Random Access Channel (PRACH) and/or measurement signal transmitted by the user equipment on the one uplink carrier; or to obtain the first TA value configured by the second base station to the user equipment, through the receiving module, wherein the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or to obtain the first TA value configured by a predefined or preconfigured base station other than the first base station and the second base station to the user equipment, through the receiving module, wherein the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

In the two preferred embodiments above, the transmitting module configured to obtain the second TA value is configured:

to obtain the second TA value configured by the second base station to the user equipment, through the receiving module, wherein the second TA value is determined by the second base station according to a received PRACH and/or measurement signal transmitted by the user equipment on the one uplink carrier; or to obtain the second TA value configured by the first base station to the user equipment, through the receiving module, wherein the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or to obtain the second TA value configured by a predefined or preconfigured base station other than the first base station and the second base station to the user equipment, through the receiving module, wherein the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In a further preferred embodiment, the transmitting module is configured:

to transmit a plurality of uplink channels on which the uplink control information is carried, using the same TA value in the same uplink sub-frame on the one uplink carrier, wherein uplink control information corresponding to downlink carriers scheduled by the different base stations is carried on the different uplink channels for transmission; or to transmit at least one uplink channel on which the uplink control information is carried, and at least one uplink channel and/or SRS on and/or in which other information is carried, using the same TA value in the same uplink sub-frame on the one uplink carrier, wherein uplink control information corresponding to downlink carriers scheduled by the different base stations is carried on the same uplink channel for transmission or carried respectively on different uplink channels for transmission; or to transmit uplink control information corresponding to downlink carriers scheduled by the different base stations, respectively using different TA values in different uplink sub-frames on the one uplink carrier;

wherein the uplink channel includes a Physical Uplink Control Channel (PUCCH) and a PUSCH.

An embodiment of the invention further provides another user equipment comprising a transceiver, and at least one processor connected with the transceiver, wherein: the transceiver is configured to receive data on a first carrier, and to receive data on a second carrier, wherein the data on the first carrier are scheduled by a first base station, and the data on the second carrier are scheduled by a second base station; and the processor is configured to generate first uplink control information for the first carrier and/or to generate second uplink control information for the second carrier; and to trigger the transceiver to transmit the uplink control information generated by the processor, including at least one of the first uplink control information and the second uplink control information, on one uplink carrier according to a preconfigured Timing Advance (TA) value, and a predefined or preconfigured reference carrier for obtaining uplink transmission time of the user equipment.

In an embodiment of the invention, the one uplink carrier on which the user equipment transmits the uplink control information is:

only one uplink carrier for transmitting uplink, configured by the network side for the user equipment; or predefined or preconfigured one of a plurality of uplink carriers for transmitting uplink data, configured by the network side for the user equipment; or an uplink primary component carrier of the user equipment.

In a preferred embodiment, the processor is further configured:

to determine uplink transmission time according to a preconfigured Timing Advance (TA) value, and a predefined or preconfigured reference carrier for obtaining the uplink transmission time; and to trigger the transceiver to transmit the uplink control information at the uplink transmission time on the one uplink carrier.

In this embodiment, the processor configured to obtain the TA value and/or the reference carrier is configured:

to receive configuration information transmitted by the first base station, and to obtain the TA value and/or the reference carrier; or to receive configuration information transmitted by the second base station, and to obtain the TA value and/or the reference carrier; or to receive configuration information transmitted by a predefined base station other than the first base station and the second base station, and to obtain the TA value and/or the reference carrier; or to receive configuration information transmitted by a base station scheduling a primary component carrier of the user equipment, and to obtain the TA value and/or the reference carrier; or to receive configuration information transmitted by a base station scheduling the one uplink carrier, and to obtain the TA value and/or the reference carrier; or to receive configuration information transmitted by a base station scheduling transmission of a PUSCH and/or transmission of an SRS on the one uplink carrier, and to obtain the TA value and/or the reference carrier; or to receive configuration information transmitted by a base station scheduling transmission of a PUSCH and/or transmission of an SRS in the current uplink sub-frame, or an uplink sub-frame adjacent to the current sub-frame, on the one uplink carrier, and to obtain the TA value and/or the reference carrier.

In this embodiment, the TA value determined by the processor is:

a first TA value of the user equipment relative to the first base station; or a TA value obtained by compensating a first TA value of the user equipment relative to the first base station, with respect to a target base station which is a predefined or preconfigured base station other than the first base station; or a second TA value of the user equipment relative to the second base station; or a TA value obtained by compensating a second TA value of the user equipment relative to the second base station, with respect to a target base station which is a predefined or preconfigured base station other than the second base station; or a TA value of the user equipment relative to a predefined base station other than the first base station and the second base station; or a TA value obtained by compensating a TA value of the user equipment relative to a predefined or preconfigured base station other than the first base station and the second base station, with respect to a target base station which is a predefined or preconfigured base station other than the present base station; or a TA value of the user equipment relative to a base station scheduling a downlink primary component carrier of the user equipment; or a TA value of the user equipment relative to the base station scheduling the one uplink carrier; or a TA value for the user equipment to transmit a PUSCH and/or an SRS on the one uplink carrier; or a TA value for the user equipment to transmit a PUSCH and/or an SRS in the current uplink sub-frame, or an uplink sub-frame adjacent to the current frame, on the one uplink carrier; or the average of TA values of the user equipment relative to the respective base stations scheduling data for the user equipment, wherein the average is predetermined by the respective base stations and notified by one of the respective base stations to the user equipment, or is determined by one of the respective base stations and notified by the base station to the user equipment and the other base stations among the respective base stations; or one of TA values of the user equipment relative to the respective base stations scheduling data for the user equipment, wherein the TA value is predetermined by the respective base stations and notified by one of the respective base stations to the user equipment, or is determined by one of the respective base stations and notified by the base station to the user equipment and the other base stations among the respective base stations; or a TA value obtained with a predefined optimization method based on TA values of the user equipment relative to the respective base stations scheduling data for the user equipment, wherein the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations.

In this embodiment, the reference carrier determined by the processor is:

one of downlink carriers scheduled by the first base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

In another preferred embodiment of the invention, the processor is configured: to use a preconfigured first TA value as a TA value for transmitting the first uplink control information, wherein the first TA value is a TA value of the user equipment relative to the first base station, to use one of downlink carriers scheduled by the first base station or a downlink primary component carrier of the user equipment or a downlink carrier paired with the one uplink carrier as the reference carrier for obtaining the uplink transmission time, to determine uplink transmission time at which the first uplink control information is transmitted, according to the first TA value and the reference carrier, and to trigger the transceiver to transmit the first uplink control information at the determined uplink transmission time on the one uplink carrier; and to use a preconfigured second TA value as a TA value for transmitting the second uplink control information, wherein the second TA value is a TA value of the user equipment relative to the second base station, to use one of downlink carriers scheduled by the second base station or the downlink primary component carrier of the user equipment or the downlink carrier paired with the one uplink carrier as the reference carrier for obtaining the uplink transmission time of the user equipment, to determine uplink transmission time at which the second uplink control information is transmitted, according to the second TA value and the reference carrier, and to trigger the transceiver to transmit the second uplink control information at the determined uplink transmission time on the one uplink carrier.

In the two preferred embodiments above, the processor configured to obtain the first TA value is configured:

to obtain the first TA value configured by the first base station to the user equipment, through the transceiver, wherein the first TA value is determined by the first base station according to a received Physical Random Access Channel (PRACH) and/or measurement signal transmitted by the user equipment on the one uplink carrier; or to obtain the first TA value configured by the second base station to the user equipment, through the transceiver, wherein the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or to obtain the first TA value configured by a predefined or preconfigured base station other than the first base station and the second base station to the user equipment, through the transceiver, wherein the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

Further to the two preferred embodiments above, the processor configured to obtain the second TA value is configured:

to obtain the second TA value configured by the second base station to the user equipment, through the transceiver, wherein the second TA value is determined by the second base station according to a received PRACH and/or measurement signal transmitted by the user equipment on the one uplink carrier; or to obtain the second TA value configured by the first base station to the user equipment, through the transceiver, wherein the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or to obtain the second TA value configured by a predefined or preconfigured base station other than the first base station and the second base station to the user equipment, through the transceiver, wherein the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In the first preferred embodiment, the processor is configured:

to trigger the transceiver to transmit a plurality of uplink channels on which the uplink control information generated by the processor is carried, using the same TA value in the same uplink sub-frame on the one uplink carrier, wherein uplink control information corresponding to downlink carriers scheduled by the different base stations is carried on the different uplink channels for transmission; or to trigger the transceiver to transmit at least one uplink channel on which the uplink control information generated by the processor is carried, and at least one uplink channel and/or SRS on and/or in which other information is carried, using the same TA value in the same uplink sub-frame on the one uplink carrier, wherein uplink control information corresponding to downlink carriers scheduled by the different base stations is carried on the same uplink channel for transmission or carried respectively on different uplink channels for transmission;

wherein the uplink channel includes a Physical Uplink Control Channel (PUCCH) and a PUSCH.

In the second preferred embodiment, the processor is configured:

to trigger the transceiver to transmit uplink control information corresponding to downlink carriers scheduled by the different base stations, respectively using different TA values in different uplink sub-frames on the one uplink carrier, wherein the uplink channel includes a PUCCH and a PUSCH.

The user equipment according to the embodiment of the invention can transmit the uplink control information corresponding to the downlink carriers scheduled by the different base stations scheduling data for the user equipment, on the only one uplink carrier to thereby feed back the uplink control information in a timely manner while lowering the cost of the user equipment.

An embodiment of the invention further provides a base station comprising:

a data transmitting module configured to transmit data for a user equipment on a first carrier, wherein the user equipment is configured with the first carrier and a second carrier, the data on the first carrier are scheduled by the first base station, and data on the second carrier are scheduled by a second base station; and a processing module configured to receive uplink control information transmitted by the user equipment, on one uplink carrier according to a TA value for the user equipment to transmit the uplink control information, and a reference carrier for obtaining uplink transmission time of the user equipment, wherein the uplink control information includes at least first uplink control information generated by the user equipment for the first carrier, and the one uplink carrier is used for transmitting uplink control information corresponding to the respective base stations scheduling data for the user equipment.

In an embodiment, the processing module is configured:

to determine the TA value for the user equipment to transmit the uplink control information, and the reference carrier for obtaining the uplink transmission time of the user equipment; to determine a reception time window according to the TA value and the reference carrier; and to receive the uplink control information in the reception time window on the one uplink carrier.

In an embodiment of the invention, the processing module configured to determine the TA value for the user equipment to transmit the uplink control information is configured:

to determine the TA value according to a received Physical Random Access Channel (PRACH) and/or measurement signal transmitted by the user equipment on the one uplink carrier; or to obtain the TA value by compensating a TA value determined according to a received PRACH and/or measurement signal transmitted by the user equipment on the one uplink carrier, with respect to a target base station which is a predefined or preconfigured base station other than the present base station; or to obtain the TA value according to received information transmitted by any other base station scheduling data for the user equipment than the present base station, wherein the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the base station; or the TA value is a TA value determined by the other base station according to a predetermined rule, wherein the other base station includes at least the base station scheduling the data on the second carrier, a base station scheduling a downlink primary component carrier of the user equipment, a base station scheduling the one uplink carrier, a base station triggering transmission of a PUSCH and/or transmission of an SRS on the one uplink carrier, and a base station triggering transmission of a PUSCH and/or transmission of an SRS, in the current uplink sub-frame, or an uplink sub-frame adjacent to the current sub-frame, on the one uplink carrier; or to determine the TA value according to a predetermined rule;

wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

Preferably the processing module is configured:

to compensate the TA value of the present base station according to at least one of a relative position, a frequency characteristic, and a transmission delay, between the present base station and a corresponding target base station.

Preferably the data transmitting module is further configured:

to notify the user equipment of the TA value for the user equipment to transmit the uplink control information, determined by the processing module; and/or to notify the other base stations scheduling data for the user equipment than the present base station, of the TA value for the user equipment to transmit the uplink control information, determined by the processing module.

In an embodiment of the invention, the reference carrier is:

one of downlink carriers scheduled by the base station; or
one of downlink carriers scheduled by the second base station; or
a downlink primary component carrier of the user equipment; or
a downlink carrier paired with the one uplink carrier; or
one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS, in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

Preferably the data transmitting module is further configured:

to notify the user equipment of the reference carrier for the user equipment to transmit the uplink control information, determined by the processing module; and/or to notify the other base stations scheduling data for the user equipment than the present base station, of the reference carrier for the user equipment to transmit the uplink control information, determined by the processing module.

An embodiment of the invention further provides a base station comprising a transceiver, and at least one processor connected with the transceiver, wherein:

the transceiver configured to transmit data for a user equipment on a first carrier, wherein the user equipment is configured with the first carrier and a second carrier, the data on the first carrier are scheduled by the first base station, and data on the second carrier are scheduled by a second base station; and the processor is configured to trigger the transceiver to receive uplink control information transmitted by the user equipment, on one uplink carrier according to a TA value for the user equipment to transmit the uplink control information, and a reference carrier for obtaining uplink transmission time of the user equipment, wherein the uplink control information includes at least first uplink control information generated by the user equipment for the first carrier, and the one uplink carrier is used for transmitting uplink control information corresponding to the respective base stations scheduling data for the user equipment.

In an embodiment, the processor is configured:

to determine the TA value for the user equipment to transmit the uplink control information, and the reference carrier for obtaining the uplink transmission time of the user equipment; to determine a reception time window according to the TA value and the reference carrier; and to trigger the transceiver to receive the uplink control information in the reception time window on the one uplink carrier.

In an embodiment of the invention, the processor configured to determine the TA value for the user equipment to transmit the uplink control information is configured:

to determine the TA value according to a received Physical Random Access Channel (PRACH) and/or measurement signal transmitted by the user equipment on the one uplink carrier; or to obtain the TA value by compensating a TA value determined according to a received PRACH and/or measurement signal transmitted by the user equipment on the one uplink carrier, with respect to a target base station which is a predefined or preconfigured base station other than the present base station; or to obtain the TA value according to received information transmitted by any other base station scheduling data for the user equipment than the present base station, wherein the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the base station; or the TA value is a TA value determined by the other base station according to a predetermined rule, wherein the other base station includes at least the base station scheduling the data on the second carrier, a base station scheduling a downlink primary component carrier of the user equipment, a base station scheduling the one uplink carrier, a base station triggering transmission of a PUSCH and/or transmission of an SRS on the one uplink carrier, and a base station triggering transmission of a PUSCH and/or transmission of an SRS, in the current uplink sub-frame, or an uplink sub-frame adjacent to the current sub-frame, on the one uplink carrier; or to determine the TA value according to a predetermined rule;

wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

Preferably the processor is configured:

to compensate the TA value of the present base station according to at least one of a relative position, a frequency characteristic, and a transmission delay, between the present base station and a corresponding target base station.

Preferably the transceiver is further configured:

to notify the user equipment of the TA value for the user equipment to transmit the uplink control information, determined by the processor; and/or to notify the other base stations scheduling data for the user equipment than the present base station, of the TA value for the user equipment to transmit the uplink control information, determined by the processor.

In an embodiment of the invention, the reference carrier for the user equipment to transmit the uplink control information, determined by the processor is:

one of downlink carriers scheduled by the base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS, in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

Preferably the transceiver is further configured:

to notify the user equipment of the reference carrier for the user equipment to transmit the uplink control information, determined by the processor; and/or to notify the other base stations scheduling data for the user equipment than the present base station, of the reference carrier for the user equipment to transmit the uplink control information, determined by the processor.

DETAILED DESCRIPTION OF THE EMBODIMENTS

Figure 1:
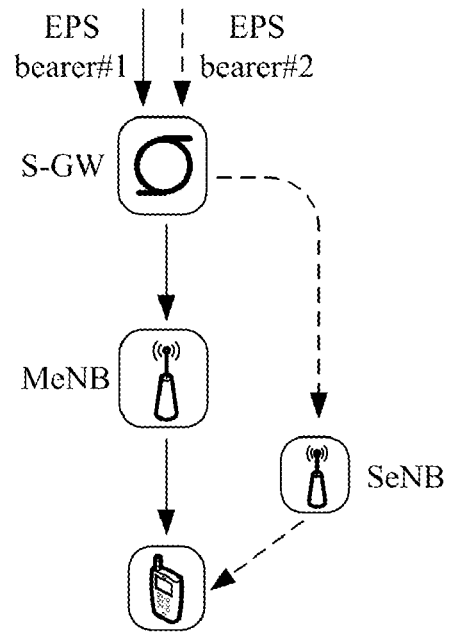
FIG. 1 illustrates a schematic diagram of a first scheme of data scheduling and transmission for a user equipment in a dual connectivity scenario in the prior art.
Figure 2:
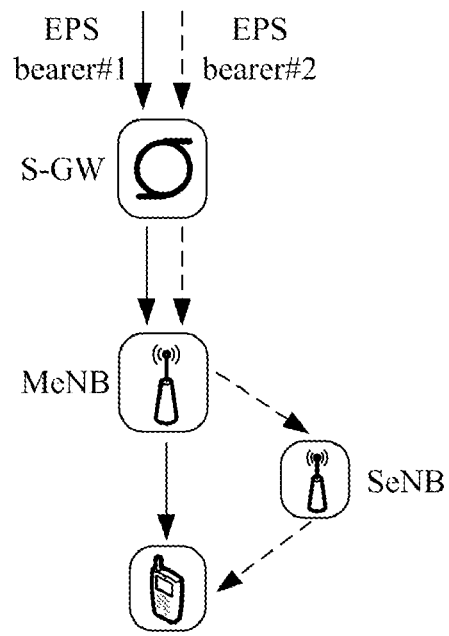
FIG. 2 illustrates a schematic diagram of a second scheme of data scheduling and transmission for a user equipment in a dual connectivity scenario in the prior art.
Figure 3:
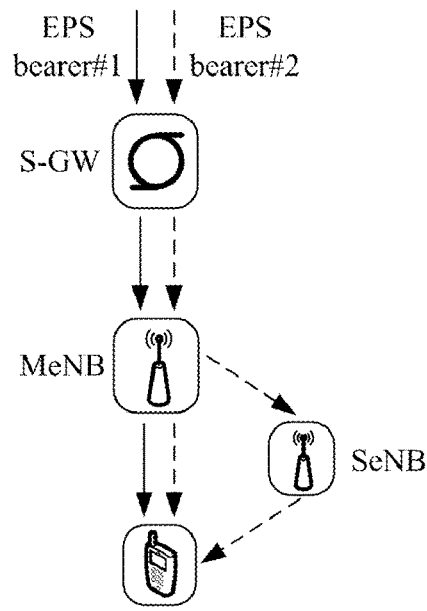
FIG. 3 illustrates a schematic diagram of a third scheme of data scheduling and transmission for a user equipment in a dual connectivity scenario in the prior art.

Since a user equipment may transmit data in the uplink in a single cell/over a single carrier in view of the complexity and cost of radio frequency, embodiments of the invention provide a method for a user equipment to transmit uplink control information corresponding to a plurality of base stations scheduling data for the user equipment, on one uplink carrier in a dual connectivity scenario, so that the user equipment can transmit uplink control information corresponding to downlink carriers scheduled by the different base stations, on the only one uplink carrier, and in this way, the user equipment can feed back the uplink control information to the respective base stations in a timely manner in the dual connectivity scenario while lowering the cost of the user equipment.

In the embodiments of the invention, for the sake of a description of the technical solutions of the invention, the terms "first", "second", etc., as used are intended to distinguish the different base stations scheduling data for the user equipment from each other, and to distinguish the downlink carriers scheduled by the different base stations from each other, but not to limit the numbers and operating priorities of the base stations and the downlink carriers.

For example, if a first base station refers to a Master evolved NodeB (MeNB) of the user equipment, then a second base station can refer to a Secondary evolved NodeB (SeNB) of the user equipment or refer to all the SeNBs of the user equipment.

In an embodiment of the invention, the first base station and the second base station can be particularly as follows:

The first base station is an MeNB, and the second base station is an SeNB; or

The first base station is an SeNB, and the second base station is an MeNB; or

The first base station is a base station of a macro cell, and the second base station is a base station of a small cell; or The first base station is a base station of a small cell, and the second small is a base station of a macro cell; or The first base station is a base station serving a Primary Component Carrier (PCC) of the user equipment, and the second base station is a base station serving at least one Secondary Component Carrier (SCC) of the user equipment.

It shall be noted that the first base station comprises at least one base station scheduling data for the user equipment; and the second base station is a base station other than the first base station, and the second base station includes at least one base station scheduling data for the user equipment.

In the embodiments of the invention, a first carrier refers to a downlink carrier scheduled by the first base station for the user equipment, and the first carrier can refer to a set of all the downlink carriers scheduled by the first base station, or can refer to a set of a part of the downlink carriers scheduled by the first base station, or can refer to any one of the downlink carriers scheduled by the first base station; and a second carrier refers to a downlink carrier scheduled by the second base station for the user equipment, and the second carrier can refer to a set of all the downlink carriers scheduled by the second base station, or can refer to a set of a part of the downlink carriers scheduled by the second base station, or can refer to any one of the downlink carriers scheduled by the second base station.

Particularly the first carrier and the second carrier may or may not operate at the same frequency.

In the embodiments of the invention, the uplink control information includes but will not be limited to at least one of the following information:

Acknowledgment (ACK)/Negative Acknowledgement (NACK) feedback information, Channel State Information (CSI) feedback information, and Scheduling Request (SR) information; and Particularly the CSI feedback information includes but will not be limited to at least one of the following information:

A Channel Quality Indicator (CQI), a Pre-coding Matrix Indicator (PMI), a Rank Indication (RI), and a Pre-coding Type Indicator (PTI).

In the embodiments of the invention, the first uplink control information refers to uplink control information generated by the user equipment for the first carrier, and the second uplink control information refers to uplink control information generated by the user equipment for the second carrier.

Figure 4:
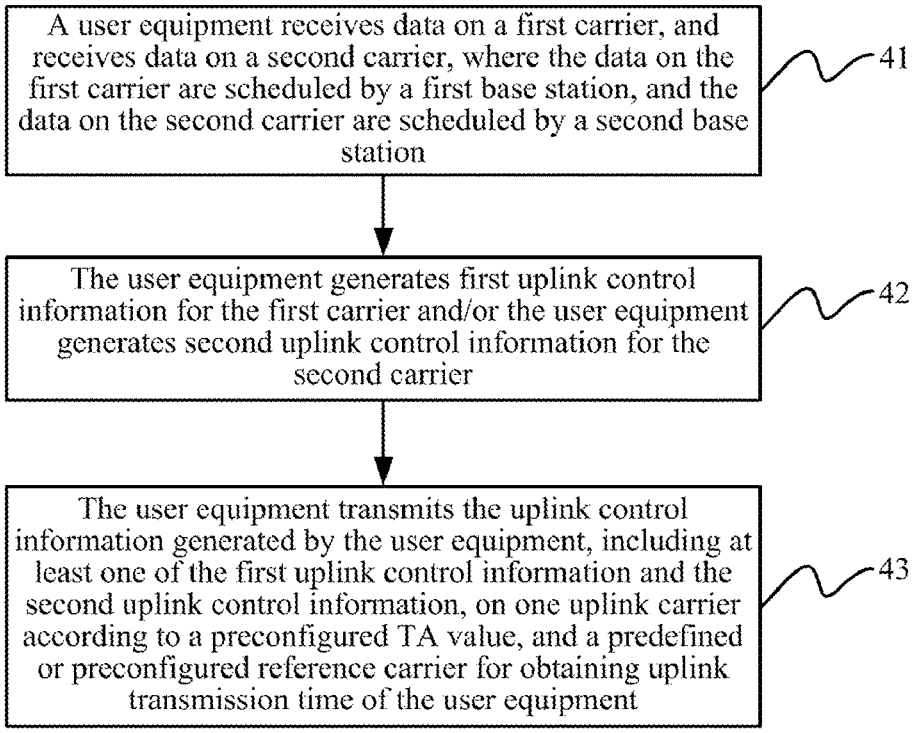
FIG. 4 illustrates a schematic diagram of a method for transmitting uplink control information according to an embodiment of the invention.

Referring to FIG. 4, an embodiment of the invention provides a method for transmitting uplink control information, which is applicable to a dual connectivity scenario, the method including the following operations:

In the operation 41, a user equipment receives data on a first carrier, and receives data on a second carrier, where the data on the first carrier are scheduled by a first base station, and the data on the second carrier are scheduled by a second base station.

In this operation, the user equipment may firstly receive data on the first or second carrier, and then receive data on the second or first carrier.

In this operation, the receiving of data by the user equipment on the first carrier includes two results: one is that data scheduled by the first base station is received on the first carrier, and the other is that no data is received on the first carrier; and Similarly, the receiving of data by the user equipment on the second carrier includes two results: one is that data scheduled by the second base station is received on the second carrier, and the other is that no data on is received the second carrier.

In the operation 42, the user equipment generates first uplink control information for the first carrier and/or the user equipment generates second uplink control information for the second carrier.

Particularly in this operation, the user equipment generating the first uplink control information for the first carrier refers to the user equipment generating uplink control information corresponding to the first carrier for the first carrier; and the user equipment generating the second uplink control information for the second carrier refers to the user equipment generating uplink control information corresponding to the second carrier for the second carrier.

In this operation, if the user equipment transmits the uplink control information generated by the user equipment, on the same uplink channel in the same uplink sub-frame on the uplink carrier, then the user equipment may generate the first uplink control information for the first carrier, and generate the second uplink control information for the second carrier, regardless of whether the user equipment receives data on the first carrier and the second carrier, where if the user equipment does not receive any data on the first carrier or the second carrier, then the user equipment may use NACK/Discontinuous Transmission (DTX) (or other indication information indicating that no data is received on the downlink carrier) as the uplink control information corresponding to the first carrier or the second carrier;

Otherwise, that is, if the user equipment transmits the uplink control information generated by the user equipment, on different uplink channels on the uplink carrier, then the user equipment may generate corresponding uplink control information only for downlink carriers for which uplink control information needs to be transmitted in the current uplink sub-frame. Particularly:

If the uplink control information to be transmitted comprises ACK/NACK feedback information, then:

If the user equipment receives data only in downlink sub-frames, on the first carrier, for which a feedback needs to be made in the current uplink sub-frame, then the user equipment may generate only the first uplink control information in the current uplink sub-frame without generating the second uplink control information for the second carrier; if the user equipment receives data only in downlink sub-frames, on the second carrier, for which a feedback needs to be made in the current uplink sub-frame, then the user equipment may generate only the second uplink control information in the current uplink sub-frame without generating the first uplink control information for the first carrier; and if the user equipment does not receive data in downlink sub-frames, on both the first carrier and the second carrier, for which a feedback needs to be made in the current uplink sub-frame, then the user equipment may generate the first uplink control information and the second uplink control information in the current uplink sub-frame; and If the uplink control information to be transmitted comprises CSI feedback information, then:

If the current uplink sub-frame is only a periodical CSI feedback sub-frame corresponding to the first carrier, then the user equipment may generate only the first uplink control information in the current uplink sub-frame without generating the second uplink control information for the second carrier; if the current uplink sub-frame is only a periodical CSI feedback sub-frame corresponding to the second carrier, then the user equipment may generate only the second uplink control information in the current uplink sub-frame without generating the first uplink control information for the first carrier; and if the current uplink sub-frame is a periodical CSI feedback sub-frame corresponding to both the first carrier and the second carrier, then the user equipment may generate the first uplink control information and the second uplink control information in the current uplink sub-frame.

Operation 43. The user equipment transmits the uplink control information generated by the user equipment, comprising at least one of the first uplink control information and the second uplink control information, on one uplink carrier according to a preconfigured TA value, and a predefined or preconfigured reference carrier for obtaining uplink transmission time of the user equipment.

Particularly if the user equipment generates only the first uplink control information for the first carrier in the operation 42, then in this operation, the user equipment may only transmit the first uplink control information on one predefined or preconfigured uplink channel for transmitting the first uplink control information, on the one uplink carrier; if the user equipment generates only the second uplink control information for the second carrier in the operation 42, then in this operation, the user equipment may only transmit the second uplink control information on one predefined or preconfigured uplink channel for transmitting the second uplink control information, on the one uplink carrier; and if the user equipment generates the first uplink control information and the second uplink control information respectively for the first carrier and the second carrier in the operation 42, then in this operation, the user equipment may transmit the first uplink control information on one predefined or preconfigured uplink channel for transmitting the first uplink control information, and transmit the second uplink control information on one predefined or preconfigured uplink channel for transmitting the second uplink control information, on the one uplink carrier.

In the embodiment of the invention, the user equipment receives data on the first carrier scheduled by the first base station, and receives data on the second carrier scheduled by the second base station; the user equipment generates the first uplink control information for the first carrier and/or the user equipment generates the second uplink control information for the second carrier; and the user equipment transmits the uplink control information generated by the user equipment, on one uplink carrier, so that the user equipment can transmit the uplink control information corresponding to the downlink carriers scheduled by the different base stations, on the only one uplink carrier to thereby feed back the uplink control information normally and in a timely manner while lowering the cost of the user equipment.

In an embodiment of the invention, the one uplink carrier for transmitting the uplink control information corresponding to the respective base station scheduling data for the user equipment in the operation 43 is particularly:

Only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

It shall be noted that a network-side device configuring the user equipment with the uplink carrier or carriers for transmitting uplink data can be the first base station or can be a base station other than the first base station or can be a network-side device which is not a base station.

In an implementation, the user equipment transmits the uplink control information generated by the user equipment, on the one uplink carrier in the operation 43 particularly in the following two preferred schemes:

In a scheme A, the user equipment transmits the uplink control information generated by the user equipment, on the one uplink carrier in the following operations:

The user equipment determines uplink transmission time of the user equipment according to a preconfigured Timing Advance (TA) value, and a predefined or preconfigured reference carrier for obtaining the uplink transmission time; and The user equipment transmits the uplink control information generated by the user equipment at the uplink transmission time determined above, on the one uplink carrier.

In this scheme A, the user equipment is preconfigured with the TA value for the user equipment to transmit the uplink control information, where the user equipment can be preconfigured with the TA value by the first base station, the second base station, or another base station scheduling data for the user equipment; and the reference carrier for the user equipment to transmit the uplink control information can be preconfigured to the user equipment, or can be predefined between the user equipment and the respective base stations scheduling data for the user equipment, where the user equipment can be preconfigured with the reference carrier by the first base station, the second base station, or another base station scheduling data for the user equipment.

In an implementation, the user equipment obtains the TA value and/or the reference carrier for transmitting the uplink control information in the scheme A as follows:

The user equipment receives configuration information transmitted by the first base station, and obtains the TA value and/or the reference carrier; or The user equipment receives configuration information transmitted by the second base station, and obtains the TA value and/or the reference carrier; or The user equipment receives configuration information transmitted by a predefined base station other than the first base station and the second base station, and obtains the TA value and/or the reference carrier; or The user equipment receives configuration information transmitted by a base station scheduling a primary component carrier of the user equipment, and obtains the TA value and/or the reference carrier; or The user equipment receives configuration information transmitted by a base station scheduling the one uplink carrier, and obtains the TA value and/or the reference carrier; or The user equipment receives configuration information transmitted by a base station scheduling transmission of a Physical Uplink Shared Channel (PUSCH) and/or transmission of a Sounding Reference Symbol (SRS) on the one uplink carrier, and obtains the TA value and/or the reference carrier; or The user equipment receives configuration information transmitted by a base station scheduling transmission of a PUSCH and/or transmission of an SRS in the current uplink sub-frame, or an uplink sub-frame adjacent to the current sub-frame, on the one uplink carrier, and obtains the TA value and/or the reference carrier.

Furthermore the TA value and the reference carrier for the user equipment to transmit the uplink control information on the one uplink carrier in the scheme A comprise the following five preferred schemes:

In a scheme A1, the TA value for the user equipment to transmit the uplink control information on the one uplink carrier is particularly any one of the following TA values:

1. A TA value of the user equipment relative to a base station scheduling a downlink primary component carrier of the user equipment;

Preferably the TA value is determined by the base station scheduling the downlink primary component carrier of the user equipment according to a received Physical Random Access Channel (PRACH) and/or measurement signal (e.g., SRS) transmitted by the user equipment on the one uplink carrier.

2. A TA value of the user equipment relative to the base station scheduling the one uplink carrier;

Preferably the TA value is determined by the base station scheduling the one uplink carrier according to a received PRACH and/or measurement signal (e.g., SRS) transmitted by the user equipment on the one uplink carrier.

3. A TA value for the user equipment to transmit a Physical Uplink Shared Channel (PUSCH) and/or a Sounding Reference Symbol (SRS) on the one uplink carrier;

Particularly the PUSCH and/or the SRS can be triggered by the first base station or by the second base station or by a base station other than the first base station and the second base station.

4. A TA value for the user equipment to transmit a PUSCH and/or an SRS in the current uplink sub-frame, or an uplink sub-frame adjacent to the current sub-frame, on the one uplink carrier;

Particularly the PUSCH and/or the SRS can be triggered by the first base station or by the second base station or by a base station other than the first base station and the second base station.

5. The average of TA values of the user equipment relative to the respective base stations scheduling data for the user equipment;

Particularly the average is predetermined by the respective base stations scheduling data for the user equipment and notified by one of the respective base stations to the user equipment, or the average is determined by one of the respective base stations scheduling data for the user equipment and notified by the base station to the user equipment and the other base stations.

6. One of TA values of the user equipment relative to the respective base stations scheduling data for the user equipment;

Particularly the TA value is one of TA values predefined by the respective base stations scheduling data for the user equipment and notified by one of the respective base stations to the user equipment, or is predetermined by one of the respective base stations scheduling data for the user equipment and notified by the base station to the user equipment and the other base stations.

7. A TA value obtained with a predefined optimization method based on TA values of the user equipment relative to the respective base stations scheduling data for the user equipment;

Particularly the TA value is predetermined by the respective base stations scheduling data for the user equipment using the predefined optimization method and notified by one of the respective base stations to the user equipment, or is predetermined by one of the respective base stations scheduling data for the user equipment using the predefined optimization method and notified by the base station to the user equipment and the other base stations.

Correspondingly the reference carrier for the user equipment to transmit the uplink control information on the one uplink carrier is particularly any one of the following carriers:

1. The downlink primary component carrier of the user equipment;

2. A downlink carrier scheduled by the base station triggering transmission of a PUSCH and/or transmission of an SRS on the one uplink carrier;

3. A downlink carrier scheduled by the base station triggering transmission of a PUSCH and/or transmission of an SRS in the current uplink sub-frame, or an uplink sub-frame adjacent to the current sub-frame, on the one uplink carrier;

4. A downlink carrier scheduled by any one of the base stations scheduling downlink data for the user equipment, where the base stations scheduling downlink data for the user equipment comprise at least the first base station and the second base station; and particularly the reference carrier can be a downlink carrier scheduled by the first base station, or can be a downlink carrier scheduled by the second base station, or can be a downlink carrier other than downlink carriers scheduled by the first base station and the second carrier, or can be a downlink carrier other than the first carrier and the second carrier.

In this scheme A1, the TA value and the reference carrier can be used in any combination as long as the user equipment side and the base station side have consistent understanding of the TA value and the reference carrier for the user equipment to transmit uplink data.

In a scheme A2, the TA value and the reference carrier for the user equipment to transmit the uplink control information on the one uplink carrier are particularly:

The user equipment uses a first TA value pre-configured by the first base station (or by another base station) for the user equipment as the TA value for transmitting the uplink control information (in an embodiment of the invention, the first TA value is a TA value of the user equipment relative to the first base station), and determines one of downlink carriers scheduled by the first base station or one of downlink carriers scheduled by the second base station or the downlink primary component carrier of the user equipment or the downlink carrier paired with the one uplink carrier as the reference carrier.

In this scheme A2, the user equipment can determine one of the downlink carriers scheduled by the first base station as the reference carrier, or can determine one of the downlink carriers scheduled by the second base station as the reference carrier, or can determine the downlink primary component carrier of the user equipment as the reference carrier, or can determine a downlink carrier paired with the one uplink carrier as the reference carrier.

In this scheme A2, the first TA value is a TA value determined by the first base station by receiving a PRACH and/or a measurement signal (e.g., an SRS) transmitted by the user equipment on the one uplink carrier.

Furthermore the first base station notifies the user equipment of the first TA value in higher-layer signaling after determining the first TA value.

Preferably the higher-layer signaling can be Radio Resource Control (RRC) signaling or Media Access Control (MAC) signaling.

In a scheme A3, the TA value and the reference carrier for the user equipment to transmit the uplink control information on the one uplink carrier are particularly:

The user equipment uses a second TA value pre-configured by the first base station (or by another base station) for the user equipment as the TA value for transmitting the uplink control information (in an embodiment of the invention, the second TA value is a TA value of the user equipment relative to the second base station), and determines one of the downlink carriers scheduled by the first base station (e.g., the first carrier) or one of the downlink carriers scheduled by the second base station (e.g., the second carrier) or the downlink primary component carrier of the user equipment or the downlink carrier paired with the one uplink carrier as the reference carrier.

In this scheme A3, the user equipment can determine one of the downlink carriers scheduled by the first base station as the reference carrier, or can determine one of the downlink carriers scheduled by the second base station as the reference carrier, or can determine the downlink primary component carrier of the user equipment as the reference carrier, or can determine a downlink carrier paired with the one uplink carrier as the reference carrier.

In this scheme A3, the second TA value is a TA value determined by the second base station by receiving a PRACH and/or a measurement signal (e.g., an SRS) transmitted by the user equipment on the one uplink carrier, and notified to the first base station, or The second TA value is a TA value obtained by the first base station by compensating with respect to the second base station a TA value determined by receiving a PRACH and/or a measurement signal (e.g., an SRS) transmitted by the user equipment on the one uplink carrier.

Furthermore the first base station notifies the user equipment of the second TA value in higher-layer signaling after determining the second TA value, where the higher-layer signaling can be RRC signaling or MAC signaling.

In a scheme A4, the TA value and the reference carrier for the user equipment to transmit the uplink control information on the one uplink carrier are particularly:

The user equipment uses a second TA value pre-configured by the second base station (or by another base station) for the user equipment as the TA value for transmitting the uplink control information (in an embodiment of the invention, the second TA value is a TA value of the user equipment relative to the second base station), and determines one of the downlink carriers scheduled by the first base station (e.g., the first carrier) or one of the downlink carriers scheduled by the second base station (e.g., the second carrier) or the downlink primary component carrier of the user equipment or the downlink carrier paired with the one uplink carrier as the reference carrier.

In this scheme A4, the user equipment can determine one of the downlink carriers scheduled by the first base station as the reference carrier, or can determine one of the downlink carriers scheduled by the second base station as the reference carrier, or can determine the downlink primary component carrier of the user equipment as the reference carrier, or can determine a downlink carrier paired with the one uplink carrier as the reference carrier.

In this scheme A4, the second TA value is a TA value determined by the second base station by receiving a PRACH and/or a measurement signal (e.g., an SRS) transmitted by the user equipment on the one uplink carrier.

Furthermore the second base station notifies the user equipment of the second TA value in higher-layer signaling after determining the second TA value, where the higher-layer signaling can be RRC signaling or MAC signaling.

In a scheme A5, the TA value and the reference carrier for the user equipment to transmit the uplink control information on the one uplink carrier are particularly:

The user equipment uses a first TA value pre-configured by the second base station (or by another base station) for the user equipment as the TA value for transmitting the uplink control information (in an embodiment of the invention, the first TA value is a TA value of the user equipment relative to the first base station), and determines one of the downlink carriers scheduled by the first base station (e.g., the first carrier) or one of the downlink carriers scheduled by the second base station (e.g., the second carrier) or the downlink primary component carrier of the user equipment or the downlink carrier paired with the one uplink carrier as the reference carrier.

In this scheme A5, the user equipment can determine one of the downlink carriers scheduled by the first base station as the reference carrier, or can determine one of the downlink carriers scheduled by the second base station as the reference carrier, or can determine the downlink primary component carrier of the user equipment as the reference carrier, or can determine a downlink carrier paired with the one uplink carrier as the reference carrier.

In this scheme A5, the first TA value is a TA value determined by the first base station by receiving a PRACH and/or a measurement signal (e.g., an SRS) transmitted by the user equipment on the one uplink carrier, and notified to the second base station, or The first TA value is a TA value obtained by the second base station by compensating with respect to the first base station a TA value determined by receiving a PRACH and/or a measurement signal (e.g., an SRS) transmitted by the user equipment on the one uplink carrier.

Furthermore the second base station notifies the user equipment of the first TA value in higher-layer signaling after determining the first TA value, where the higher-layer signaling can be RRC signaling or MAC signaling.

It shall be noted that pairing in the embodiment of the invention refers to pairing of a downlink carrier with an uplink carrier, preconfigured in System Information Block (SIB), where they are paired so that one uplink carrier corresponds to one downlink carrier.

Although the five preferred schemes have been described above, the TA value obtained by the user equipment for transmitting the uplink control information in the embodiment of the invention will not be limited thereto.

For example, the TA value can be a TA value obtained by compensating the first TA value of the user equipment relative to the first base station, with respect to a target base station which is a predefined or preconfigured base station other than the first base station;

Particularly compensation with respect to the target base station refers to compensation for the difference between a TA value of the user equipment relative to the target base station and the first TA value, and particularly the first TA value can be compensated with respect to the target base station according to at least one of a relative position, a frequency characteristic, and a transmission delay, between the first base station and the target base station; and Preferably the target base station can be the second base station; or of course, the target base station can alternatively be another predefined or preconfigured base station.

In another example, the TA value can be a TA value obtained by compensating the second TA value of the user equipment relative to the second base station, with respect to a target base station which is a predefined or preconfigured base station other than the second base station;

Particularly compensation with respect to the target base station refers to compensation for the difference between a TA value of the user equipment relative to the target base station and the second TA value, and particularly the second TA value can be compensated with respect to the target base station according to at least one of a relative position, a frequency characteristic, and a transmission delay, between the second base station and the target base station; and Preferably the target base station can be the first base station; or of course, the target base station can alternatively be another predefined or preconfigured base station.

In a further example, the TA value can be a TA value of the user equipment relative to a predefined base station other than the first base station and the second base station.

In a still further example, the TA value can be a TA value obtained by compensating a TA value of the user equipment relative to a predefined or preconfigured base station other than the first base station and the second base station, with respect to a target base station which is a predefined or preconfigured base station other than the present base station.

It shall be noted that in an embodiment of the invention, preferably a TA value of the user equipment relative to a base station (referred to as a base station A) is configured by the base station A; or if the TA value of the user equipment relative to the base station A is determined by another base station (referred to as a base station B) than the present base station A, then the TA value configured by the base station B for the user equipment may be determined by the base station A and notified in advance to the base station B, or may be obtained by the base station B compensating a TA value of the user equipment relative to the base station B, with respect to the base station A; where if a TA value of the user equipment relative to any one base station is determined by the base station, then the TA value can be determined according to a PRACH and/or a measurement signal, received by the base station, transmitted by the user equipment on the one uplink carrier.

In this scheme A, the user equipment transmits the first uplink control information corresponding to the first carrier, and the second uplink control information corresponding to the second carrier, generated by the user equipment at the same transmission time on the one uplink carrier.

In this scheme A, the user equipment further transmits the uplink control information generated by the terminal on the one uplink carrier as follows:

The user equipment transmits a plurality of uplink channels on which the generated uplink control information is carried, using the same TA value in the same uplink sub-frame on the one uplink carrier, where uplink control information corresponding to downlink carriers scheduled by the different base stations is carried on different uplink channels for transmission; or The user equipment transmits at least one uplink channel on which the generated uplink control information is carried, and at least one uplink channel and/or SRS on and/or in which other information is carried, using the same TA value in the same uplink sub-frame on the one uplink carrier, where uplink control information corresponding to downlink carriers scheduled by the different base stations is carried on the same uplink channel for transmission or carried respectively on different uplink channels for transmission;

Particularly the uplink channel comprises a Physical Uplink Control Channel (PUCCH) and a PUSCH.

It shall be noted that the different uplink channels above differ in channel type, channel format, or channel resource, where for example, different channel types comprise a PUCCH and a PUSCH; for example, different channel formats comprise the PUCCH format 1a/1b and the PUCCH format 3; and for example, different channel resources comprise PUCCHs using different PUCCH format 3 channel resources.

In a scheme B, the user equipment transmits the uplink control information generated by the user equipment on the one uplink carrier in the following operations:

The user equipment uses a first TA value preconfigured to the user equipment as a TA value for transmitting the first uplink control information, where the first TA value is a TA value of the user equipment relative to the first base station, uses one of downlink carriers scheduled by the first base station or a downlink primary component carrier of the user equipment or a downlink carrier paired with the one uplink carrier as the reference carrier for obtaining the uplink transmission time of the user equipment, determines uplink transmission time at which the first uplink control information is transmitted, according to the first TA value and the reference carrier, and transmits the first uplink control information at the determined uplink transmission time on the one uplink carrier; and The user equipment uses a second TA value preconfigured to the user equipment as a TA value for transmitting the second uplink control information, where the second TA value is a TA value of the user equipment relative to the second base station, uses one of downlink carriers scheduled by the second base station or the downlink primary component carrier of the user equipment or the downlink carrier paired with the one uplink carrier as the reference carrier for obtaining the uplink transmission time of the user equipment, determines uplink transmission time at which the second uplink control information is transmitted, according to the second TA value and the reference carrier, and transmits the second uplink control information at the determined uplink transmission time on the one uplink carrier.

In this scheme B, the user equipment transmits the uplink control information corresponding to the different base stations using the different TA values on the one uplink carrier, that is, the user equipment transmits the uplink control information corresponding to the different base stations in different uplink sub-frames on the one uplink carrier.

It shall be noted that in the scheme B, the first TA value for the user equipment to transmit the first uplink control information, and the second TA value for the user equipment to transmit the second uplink control information can be preconfigured by the same base station to the user equipment or can be preconfigured by the different base stations to the user equipment.

In this scheme B, the user equipment obtains the first TA particularly as follows:

The user equipment obtains the first TA value configured by the first base station to the user equipment, where the first TA value is determined by the first base station according to a received PRACH and/or measurement signal transmitted by the user equipment on the one uplink carrier; or The user equipment obtains the first TA value configured by the second base station to the user equipment, where the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or The user equipment obtains the first TA value configured by a predefined or preconfigured base station other than the first base station and the second base station to the user equipment, where the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

In an implementation, the second base station obtains the first TA value by compensating the second TA value with respect to the first base station according to at least one of a relative position, a frequency characteristic, and a transmission delay, between the second base station and the first base station.

In an implementation, the predefined or preconfigured base station obtains the first TA value by compensating the TA value of the user equipment relative to the predefined or preconfigured base station, with respect to the first base station according to at least one of a relative position, a frequency characteristic, and a transmission delay, between the predefined or preconfigured base station and the first base station.

In this scheme B, the user equipment obtains the second TA particularly as follows:

The user equipment obtains the second TA value configured by the second base station to the user equipment, where the second TA value is determined by the second base station according to a received PRACH and/or measurement signal transmitted by the user equipment on the one uplink carrier; or The user equipment obtains the second TA value configured by the first base station to the user equipment, where the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or The user equipment obtains the second TA value configured by a predefined or preconfigured base station other than the first base station and the second base station to the user equipment, where the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In an implementation, the first base station obtains the second TA value by compensating the first TA value with respect to the second base station according to at least one of a relative position, a frequency characteristic, and a transmission delay, between the first base station and the second base station.

In an implementation, the predefined or preconfigured base station obtains the second TA value by compensating the TA value of the user equipment relative to the predefined or preconfigured base station, with respect to the second base station according to at least one of a relative position, a frequency characteristic, and a transmission delay, between the predefined or preconfigured base station and the second base station.

In this scheme B, the user equipment further transmits the generated uplink control information on the one uplink carrier as follows:

The user equipment transmits the uplink control information corresponding to the downlink carriers scheduled by the different base stations, using the different TA values respectively in different uplink sub-frames on the one uplink carrier.

Figure 5:
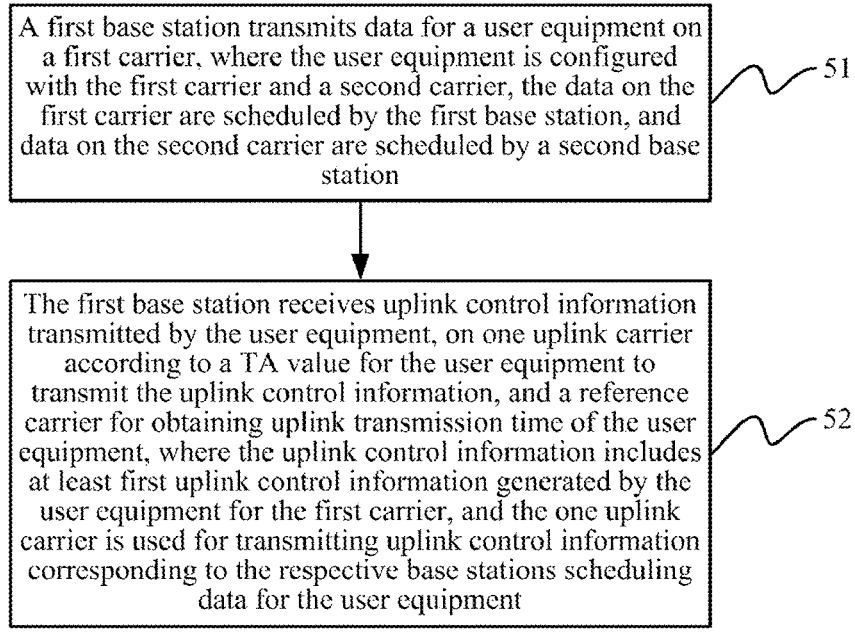
FIG. 5 illustrates a schematic diagram of a method for receiving uplink control information according to an embodiment of the invention.

Following the description above of the user equipment side, an embodiment of the invention further provides a method for receiving uplink control information, which is applicable to a dual connectivity scenario, and referring to FIG. 5, the method comprises the following operations:

In the operation 51, a first base station transmits data for a user equipment on a first carrier, where the user equipment is configured with the first carrier and a second carrier, the data on the first carrier are scheduled by the first base station, and data on the second carrier are scheduled by a second base station; and In the operation 52, the first base station receives uplink control information transmitted by the user equipment, on one uplink carrier according to a TA value for the user equipment to transmit the uplink control information, and a reference carrier for obtaining uplink transmission time of the user equipment, where the uplink control information comprises at least first uplink control information generated by the user equipment for the first carrier, and the one uplink carrier is used for transmitting uplink control information corresponding to the respective base stations scheduling data for the user equipment.

In an embodiment of the invention, the one uplink carrier for transmitting the uplink control information corresponding to the respective base stations scheduling data for the user equipment in the operation 52 is particularly:

Only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

In an embodiment of the invention, if the second base station also transmits data for the user equipment on the second carrier, then the second base station may also receive uplink control information transmitted by the user equipment, on the one uplink carrier, where the uplink control information comprises the first uplink control information and the second uplink control information; and since a process flow at the second base station is similar to that at the first base station, a repeated description thereof will be omitted here.

In an implementation, before the operation 52, the method further comprises:

The first base station determines the TA value for the user equipment to transmit the uplink control information, and the reference carrier for obtaining the uplink transmission time of the user equipment;

The first base station determines a reception time window according to the determined TA value and reference carrier; and The first base station receives the uplink control information in the determined reception time window on the one uplink carrier.

In an implementation, the first base station determines the TA value for the user equipment to transmit the uplink control information, and the reference carrier for obtaining the uplink transmission time of the user equipment particularly in the following preferred schemes:

In a first scheme, the first base station determines the TA value for the user equipment to transmit the uplink control information to be a first TA value of the user equipment relative to the first base station, and determines the reference carrier for obtaining the uplink transmission time of the user equipment to be one of downlink carriers scheduled by the first base station (or one of downlink carriers scheduled by the second base station or one of downlink carriers scheduled by another base station scheduling data for the user equipment than the first base station and the second base station) or a downlink primary component carrier of the user equipment or a downlink carrier paired with the one uplink carrier.

In this first scheme, the first TA value is determined by the first base station according to a received PRACH and/or measurement signal (e.g., SRS) transmitted by the user equipment on the one uplink carrier; and In an implementation, the first base station notifies the user equipment in a cell served by the first base station, of the first TA value in higher-layer signaling after determining the first TA value; and/or The first base station notifies the user equipment of the reference carrier in higher-layer signaling after determining the reference carrier.

Preferably the higher-layer signaling comprises MAC signaling and RRC signaling.

Of course, the reference carrier can alternatively be a carrier predefined between the base station and the user equipment.

Preferably the first base station notifies the other base stations (which are the other base stations scheduling data for the user equipment than the first base station) of the first TA value through inter-eNB communication after determining the TA value; and/or The first base station notifies the other base stations (which are the other base stations scheduling data for the user equipment than the first base station) of the reference carrier through inter-eNB communication after determining the reference carrier.

It shall be noted that the first TA value can be determined by the first base station and then notified to the user equipment and the other base stations; or the first TA value can be predefined between the respective base stations scheduling data for the user equipment and notified by one of the base stations to the user equipment, where the first base station determines the first TA value according to a received PRACH and/or measurement signal (e.g., SRS) transmitted by the user equipment on the one uplink carrier, and any one of the other base stations than the first base station obtains the first TA value by compensating with respect to the first base station a TA value determined according to a received PRACH and/or measurement signal (e.g., SRS) transmitted by the user equipment on the one uplink carrier, where any one of the other base stations compensates its determined TA value according to at least one of a relative position, a frequency characteristic, and a transmission delay, between the base station and the first base station.

In a second scheme, the first base station determines the TA value for the user equipment to transmit the uplink control information to be a second TA value of the user equipment relative to the second base station, and determines the reference carrier for obtaining the uplink transmission time of the user equipment to be one of downlink carriers scheduled by the first base station (or one of downlink carriers scheduled by the second base station or one of downlink carriers scheduled by another base station scheduling data for the user equipment than the first base station and the second base station) or a downlink primary component carrier of the user equipment or a downlink carrier paired with the one uplink carrier.

In this second scheme, the second TA value is determined by the second base station according to a received PRACH and/or measurement signal (e.g., SRS) transmitted by the user equipment on the one uplink carrier and notified to the first base station; or the second TA value is obtained by the first base station by compensating the first TA value with respect to the second base station, where the first TA value is a TA value determined by the first base station according to a received PRACH and/or measurement signal (e.g., SRS) transmitted by the user equipment on the one uplink carrier.

Preferably the first base station compensates the first TA value with respect to the second base station particularly as follows:

The first base station compensates the first TA value according to at least one of a relative position, a frequency characteristic, and a transmission delay, between the first base station and the second base station.

Preferably the first base station notifies the user equipment in a cell served by the first base station, of the second TA value in higher-layer signaling after determining the second TA value; and/or The first base station notifies the user equipment of the reference carrier in higher-layer signaling after determining the reference carrier.

Of course, the reference carrier can alternatively be a carrier predefined between the base station and the user equipment.

Preferably the higher-layer signaling comprises MAC signaling and RRC signaling.

In a third scheme, the first base station determines the TA value for the user equipment to transmit the uplink control information to be any one of the following TA values:

1. A TA value of the user equipment relative to a base station scheduling a downlink primary component carrier of the user equipment;

Particularly the first base station can obtain the TA value by compensating the first TA value with respect to the base station scheduling the downlink primary component carrier of the user equipment, or can obtain the TA value according to received information transmitted by the base station scheduling the downlink primary component carrier of the user equipment, where the base station scheduling the downlink primary component carrier of the user equipment notifies the other base stations of the TA value through inter-eNB communication after determining the TA value.

2. A TA value of the user equipment relative to a base station scheduling the one uplink carrier;

Particularly the first base station can obtain the TA value by compensating the first TA value with respect to the base station scheduling the one uplink carrier, or can obtain the TA value according to received information transmitted by the base station scheduling the one uplink carrier, where the base station scheduling the one uplink carrier notifies the other base stations of the TA value through inter-eNB communication after determining the TA value.

3. A TA value of the user equipment relative to a predefined or preconfigured base station other than the first base station and the second base station;

Particularly the first base station can obtain the TA value by compensating the first TA value with respect to the predefined or preconfigured base station, or can obtain the TA value according to received information transmitted by the predefined or preconfigured base station.

4. A TA value for the user equipment to transmit a Physical Uplink Shared Channel (PUSCH) and/or a Sounding Reference Symbol (SRS) on the one uplink carrier;

Particularly the PUSCH and/or the SRS can be triggered by the first base station or by the second base station or by a base station other than the first base station and the second base station.

5. A TA value for the user equipment to transmit a PUSCH and/or an SRS in the current uplink sub-frame, or an uplink sub-frame adjacent to the current sub-frame, on the one uplink carrier;

Particularly the PUSCH and/or the SRS can be triggered by the first base station or by the second base station or by a base station other than the first base station and the second base station.

6. The average of TA values of the user equipment relative to the respective base stations scheduling data for the user equipment;

Particularly the first base station, and the other base stations scheduling data for the user equipment predetermine the TA value for the user equipment to transmit the uplink control information to be the average, or the first base station predetermines the TA value for the user equipment to transmit the uplink control information to be the average and notifies the other base stations of the average, or the first base station obtains the average according to received information transmitted by the other base stations, where the average is determined by the other base stations scheduling data for the user equipment (e.g., the second base station) and notified to the first base station.

7. A TA value obtained with a predefined optimization method based on TA values of the user equipment relative to the respective base stations scheduling data for the user equipment;

Particularly the first base station, and the other base stations scheduling data for the user equipment predetermine the TA value for the user equipment to transmit the uplink control information to be the TA value obtained with a predefined optimization method based on the TA values of the respective base stations, or the first base station predetermines the TA value for the user equipment to transmit the uplink control information to be the TA value obtained with a predefined optimization method based on the TA values of the respective base stations, and notifies the other base station of the optimized TA value, or the first base station obtains the optimized TA value, according to received information transmitted by the other base stations, where the optimized TA value is predetermined by the other base stations scheduling data for the user equipment (e.g., the second base station) and notified to the first base station.

Correspondingly in this third scheme, the first base station determines the reference carrier for the user equipment to transmit the uplink control information, as any one of the following carriers:

1. One of downlink carriers scheduled by the first base station (e.g., the first carrier); or
2. One of downlink carriers scheduled by the second base station (e.g., the second carrier); or
3. A downlink primary component carrier of the user equipment; or
4. A downlink carrier paired with the one uplink carrier; or 5. A downlink carrier scheduled by the base station triggering transmission of a PUSCH and/or transmission of an SRS on the one uplink carrier; or
6. A downlink carrier scheduled by the base station triggering transmission of a PUSCH and/or transmission of an SRS in the current uplink sub-frame, or an uplink sub-frame adjacent to the current sub-frame, on the one uplink carrier; or
7. One of downlink carriers scheduled by a base station other than the first base station and the second base station among the respective base stations scheduling downlink data for the user equipment.

In this third scheme, the TA value and the reference carrier can be used in any combination as long as the user equipment side and the base station side have consistent understanding of the TA value and the reference carrier for the user equipment to transmit uplink data.

In the third scheme, preferably the first base station notifies the user equipment in a cell served by the first base station, of the TA value in higher-layer signaling after determining the TA value; and/or The first base station notifies the user equipment of the reference carrier in higher-layer signaling after determining the reference carrier.

Of course, the reference carrier can alternatively be a carrier predefined between the base station and the user equipment.

Preferably the higher-layer signaling comprises MAC signaling and RRC signaling.

In the third scheme, preferably the first base station notifies the other base stations (which are other base stations scheduling data for the user equipment than the first base station) of the TA value through inter-eNB communication after determining the TA value; and/or The first base station notifies the other base stations (which are other base stations scheduling data for the user equipment than the first base station) of the reference carrier through inter-eNB communication after determining the reference carrier.

In an embodiment of the invention, the first base station and the second base station receive the same uplink channel on which the uplink control information is carried, respectively in their respective determined reception time windows in the same uplink sub-frame on the one uplink carrier, where the uplink control information comprises at least the first uplink control information and the second uplink control information;

Or

The first base station receives an uplink channel on which the first uplink control information is carried, and the second base station receives an uplink channel on which the second uplink control information is carried, respectively in their respective determined reception time windows in the same uplink sub-frame on the one uplink carrier, where the uplink channel on which the first uplink control information is carried is different from the uplink channel on which the second uplink control information is carried;

Or

The first base station receives an uplink channel on which the first uplink control information is carried, and the second base station receives an uplink channel on which the second uplink control information is carried, respectively in their respective determined reception time windows in different uplink sub-frames on the one uplink carrier.

In the three reception schemes above, if the first base station and/or the second base station further has an uplink channel (e.g., a PUSCH) and/or an SRS corresponding to the base station, carrying other information, transmitted in the current uplink sub-frame, then the base station may receive the uplink channel and/or the SRS in the same reception time window.

Along with the technical evolvement and emerging data services, the concept of a small cell has been proposed and gained extensive attention. Typically there is a smaller coverage area and lower transmit power of the small cell, and a data rate of a user can be improved by deploying the small cell in a place closer to the user, e.g., indoor or a hotspot area. If the user equipment is connected with both a base station of the small cell and a base station of a macro cell, that is, the user equipment is served by both the base station of the small cell and the base station of the macro cell, which is a typical dual connectivity scenario wherein the user equipment is served concurrently by a number of base stations, then the user equipment can receive downlink services concurrently on different downlink carriers served respectively by the base station of the small cell and the base station of the macro cell, and these downlink services are scheduled separately by the base station of the small cell and the base station of the macro cell respectively.

The process flows of the methods above can be performed in software program which can be stored in a storage medium, where the operations in the methods above are performed by the software program upon being invoked.

Based upon the same inventive idea, an embodiment of the invention further provides a user equipment, and since the user equipment addresses the problem under a similar principle to the method above for transmitting uplink control information, reference can be made to the implementation of the method for an implementation of the user equipment, so a repeated description thereof will be omitted here.

Figure 6:
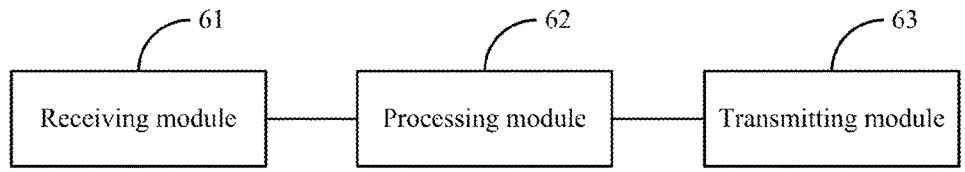
FIG. 6 illustrates a schematic diagram of a user equipment according to an embodiment of the invention.

Referring to FIG. 6, an embodiment of the invention provides a user equipment applicable to a dual connectivity scenario, the user equipment comprising:

A receiving module 61 is configured to receive data on a first carrier, and to receive data on a second carrier, where the data on the first carrier are scheduled by a first base station, and the data on the second carrier are scheduled by a second base station;

A processing module 62 is configured to generate first uplink control information for the first carrier and/or to generate second uplink control information for the second carrier; and A transmitting module 63 is configured to transmit the uplink control information generated by the processing module 62, comprising at least one of the first uplink control information and the second uplink control information, on one uplink carrier according to a preconfigured TA value, and a predefined or preconfigured reference carrier for obtaining uplink transmission time of the user equipment.

In an embodiment of the invention, the one uplink carrier on which the user equipment transmits the uplink control information is:

Only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

In a preferred embodiment, the transmitting module 63 is further configured:

To determine uplink transmission time according to a preconfigured Timing Advance (TA) value, and a predefined or preconfigured reference carrier for obtaining the uplink transmission time; and to transmit the uplink control information at the determined uplink transmission time on the one uplink carrier.

In an embodiment, the transmitting module 63 configured to obtain the TA value and/or the reference carrier is configured:

To receive configuration information transmitted by the first base station, and to obtain the TA value and/or the reference carrier; or To receive configuration information transmitted by the second base station, and to obtain the TA value and/or the reference carrier; or To receive configuration information transmitted by a predefined base station other than the first base station and the second base station, and to obtain the TA value and/or the reference carrier; or To receive configuration information transmitted by a base station scheduling a primary component carrier of the user equipment, and to obtain the TA value and/or the reference carrier; or To receive configuration information transmitted by a base station scheduling the one uplink carrier, and to obtain the TA value and/or the reference carrier; or To receive configuration information transmitted by a base station scheduling transmission of a PUSCH and/or transmission of an SRS on the one uplink carrier, and to obtain the TA value and/or the reference carrier; or To receive configuration information transmitted by a base station scheduling transmission of a PUSCH and/or transmission of an SRS in the current uplink sub-frame, or an uplink sub-frame adjacent to the current sub-frame, on the one uplink carrier, and to obtain the TA value and/or the reference carrier.

In this embodiment, the TA value determined by the transmitting module 63 is:

A first TA value of the user equipment relative to the first base station; or

A TA value obtained by compensating a first TA value of the user equipment relative to the first base station, with respect to a target base station which is a predefined or preconfigured base station other than the first base station; or A second TA value of the user equipment relative to the second base station; or A TA value obtained by compensating a second TA value of the user equipment relative to the second base station, with respect to a target base station which is a predefined or preconfigured base station other than the second base station; or A TA value of the user equipment relative to a predefined base station other than the first base station and the second base station; or A TA value obtained by compensating a TA value of the user equipment relative to a predefined or preconfigured base station other than the first base station and the second base station, with respect to a target base station which is a predefined or preconfigured base station other than the present base station; or A TA value of the user equipment relative to a base station scheduling a downlink primary component carrier of the user equipment; or A TA value of the user equipment relative to the base station scheduling the one uplink carrier; or A TA value for the user equipment to transmit a PUSCH and/or an SRS on the one uplink carrier; or A TA value for the user equipment to transmit a PUSCH and/or an SRS in the current uplink sub-frame, or an uplink sub-frame adjacent to the current frame, on the one uplink carrier; or The average of TA values of the user equipment relative to the respective base stations scheduling data for the user equipment, where the average is predetermined by the respective base stations and notified by one of the respective base stations to the user equipment, or is determined by one of the respective base stations and notified by the base station to the user equipment and the other base stations among the respective base stations; or One of TA values of the user equipment relative to the respective base stations scheduling data for the user equipment, where the TA value is predetermined by the respective base stations and notified by one of the respective base stations to the user equipment, or is determined by one of the respective base stations and notified by the base station to the user equipment and the other base stations among the respective base stations; or A TA value obtained with a predefined optimization method based on TA values of the user equipment relative to the respective base stations scheduling data for the user equipment, where the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations.

In this embodiment, the reference carrier determined by the transmitting module 63 is particularly:

One of downlink carriers scheduled by the first base station; or

One of downlink carriers scheduled by the second base station; or

A downlink primary component carrier of the user equipment; or

A downlink carrier paired with the one uplink carrier; or

One of downlink carriers scheduled by the base station triggering transmission of a PUSCH and/or transmission of an SRS on the one uplink carrier; or One of downlink carriers scheduled by the base station triggering transmission of a PUSCH and/or transmission of an SRS in the current uplink sub-frame, or an uplink sub-frame adjacent to the current sub-frame, on the one uplink carrier; or One of downlink carriers scheduled by a base station other than the first base station and the second base station among the respective base stations scheduling downlink data for the user equipment.

In another preferred embodiment, the transmitting module 63 is configured:

To use a preconfigured first TA value as a TA value for transmitting the first uplink control information, where the first TA value is a TA value of the user equipment relative to the first base station, to use one of downlink carriers scheduled by the first base station or a downlink primary component carrier of the user equipment or a downlink carrier paired with the one uplink carrier as the reference carrier for obtaining the uplink transmission time, to determine uplink transmission time at which the first uplink control information is transmitted, according to the first TA value and the reference carrier, and to transmit the first uplink control information at the determined uplink transmission time on the one uplink carrier; and To use a preconfigured second TA value as a TA value for transmitting the second uplink control information, where the second TA value is a TA value of the user equipment relative to the second base station, to use one of downlink carriers scheduled by the second base station or the downlink primary component carrier of the user equipment or the downlink carrier paired with the one uplink carrier as the reference carrier for obtaining the uplink transmission time of the user equipment, to determine uplink transmission time at which the second uplink control information is transmitted, according to the second TA value and the reference carrier, and to transmit the second uplink control information at the determined uplink transmission time on the one uplink carrier.

In the two preferred embodiments above, the transmitting module 63 configured to obtain the first TA value is configured:

To obtain the first TA value configured by the first base station to the user equipment, through the receiving module 61, where the first TA value is determined by the first base station according to a received PRACH and/or measurement signal transmitted by the user equipment on the one uplink carrier; or To obtain the first TA value configured by the second base station to the user equipment, through the receiving module 61, where the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or To obtain the first TA value configured by a predefined or preconfigured base station other than the first base station and the second base station to the user equipment, through the receiving module 61, where the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

In the two preferred embodiments above, the transmitting module 63 configured to obtain the second TA value is configured:

To obtain the second TA value configured by the second base station to the user equipment, through the receiving module 61, where the second TA value is determined by the second base station according to a received PRACH and/or measurement signal transmitted by the user equipment on the one uplink carrier; or To obtain the second TA value configured by the first base station to the user equipment, through the receiving module 61, where the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or To obtain the second TA value configured by a predefined or preconfigured base station other than the first base station and the second base station to the user equipment, through the receiving module 61, where the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In a further preferred embodiment, the transmitting module 63 is configured:

To transmit a plurality of uplink channels on which the uplink control information generated by the processing module 62 is carried, using the same TA value in the same uplink sub-frame on the one uplink carrier, where uplink control information corresponding to downlink carriers scheduled by the different base stations is carried on the different uplink channels for transmission; or To transmit at least one uplink channel on which the uplink control information generated by the processing module 62 is carried, and at least one uplink channel and/or SRS on and/or in which other information is carried, using the same TA value in the same uplink sub-frame on the one uplink carrier, where uplink control information corresponding to downlink carriers scheduled by the different base stations is carried on the same uplink channel for transmission or carried respectively on different uplink channels for transmission; or To transmit uplink control information corresponding to downlink carriers scheduled by the different base stations, respectively using different TA values in different uplink sub-frames on the one uplink carrier;

Wherein the uplink channel comprises a PUCCH and a PUSCH.

Based upon the same inventive idea, an embodiment of the invention further provides a base station, and since the base station addresses the problem under a similar principle to the method above for receiving uplink control information, reference can be made to the implementation of the method for an implementation of the base station, so a repeated description thereof will be omitted here.

Figure 7:
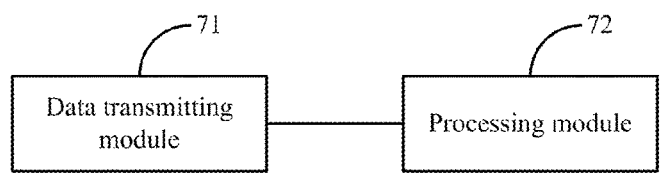
FIG. 7 illustrates a schematic diagram of a base station according to an embodiment of the invention.

Referring to FIG. 7, an embodiment of the invention provides a base station applicable to a dual connectivity scenario, the base station comprising:

A data transmitting module 71 is configured to transmit data for a user equipment on a first carrier, where the user equipment is configured with the first carrier and a second carrier, the data on the first carrier are scheduled by the first base station, and data on the second carrier are scheduled by a second base station; and A processing module 72 is configured to receive uplink control information transmitted by the user equipment, on one uplink carrier according to a TA value for the user equipment to transmit the uplink control information, and a reference carrier for obtaining uplink transmission time of the user equipment, where the uplink control information comprises at least first uplink control information generated by the user equipment for the first carrier, and the one uplink carrier is used for transmitting uplink control information corresponding to the respective base stations scheduling data for the user equipment.

In an embodiment of the invention, the one uplink carrier on which the uplink control information transmitted by the user equipment is received is:

Only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

In an embodiment, the processing module 72 is configured:

To determine the TA value for the user equipment to transmit the uplink control information, and the reference carrier for obtaining the uplink transmission time of the user equipment; to determine a reception time window according to the determined TA value and reference carrier; and to receive the uplink control information in the determined reception time window on the one uplink carrier.

In an embodiment of the invention, the processing module 72 configured to determine the TA value for the user equipment to transmit the uplink control information is configured:

To determine the TA value for the user equipment to transmit the uplink control information according to a received PRACH and/or measurement signal transmitted by the user equipment on the one uplink carrier; or To obtain the TA value for the user equipment to transmit the uplink control information by compensating a TA value determined according to a received PRACH and/or measurement signal transmitted by the user equipment on the one uplink carrier, with respect to a target base station which is a predefined or preconfigured base station other than the present base station; or To obtain the TA value for the user equipment to transmit the uplink control information according to received information transmitted by any other base station scheduling data for the user equipment than the present base station, where the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the base station; or the TA value is a TA value determined by the other base station according to a predetermined rule, where the other base station comprises at least the base station scheduling the data on the second carrier, a base station scheduling a downlink primary component carrier of the user equipment, a base station scheduling the one uplink carrier, a base station triggering transmission of a PUSCH and/or transmission of an SRS on the one uplink carrier, and a base station triggering transmission of a PUSCH and/or transmission of an SRS, in the current uplink sub-frame, or an uplink sub-frame adjacent to the current sub-frame, on the one uplink carrier; or To determine the TA value for the user equipment to transmit the uplink control information according to a predetermined rule;

Wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

Preferably the processing module 72 is configured:

To compensate the TA value of the present base station according to at least one of a relative position, a frequency characteristic, and a transmission delay, between the present base station and a corresponding target base station.

The preferably the data transmitting module 71 is further configured:

To notify the user equipment of the TA value for the user equipment to transmit the uplink control information, determined by the processing module 72; and/or To notify the other base stations scheduling data for the user equipment than the present base station, of the TA value for the user equipment to transmit the uplink control information, determined by the processing module 72.

In an embodiment of the invention, the reference carrier for the user equipment to transmit the uplink control information, determined by the processing module 72 is:

One of downlink carriers scheduled by the present base station; or

One of downlink carriers scheduled by the second base station; or

A downlink primary component carrier of the user equipment; or

A downlink carrier paired with the one uplink carrier; or

One of downlink carriers scheduled by a base station triggering transmission of a PUSCH and/or transmission of an SRS on the one uplink carrier; or One of downlink carriers scheduled by a base station triggering transmission of a PUSCH and/or transmission of an SRS, in the current uplink sub-frame, or an uplink sub-frame adjacent to the current sub-frame, on the one uplink carrier; or One of downlink carriers scheduled by a base station other than the present base station and the second base station among the respective base stations scheduling downlink data for the user equipment.

Preferably the data transmitting module 71 is further configured:

To notify the user equipment of the reference carrier for the user equipment to transmit the uplink control information, determined by the processing module 72; and/or To notify the other base stations scheduling data for the user equipment than the present base station, of the reference carrier for the user equipment to transmit the uplink control information, determined by the processing module 72.

The structure of and processing by a user equipment according to an embodiment of the invention will be described below in connection with a hardware structure thereof.

In the embodiment illustrated in FIG. 6, the user equipment comprises a transceiver, and at least one processor connected with the transceiver, where:

The transceiver is configured to receive data on a first carrier, and to receive data on a second carrier, where the data on the first carrier are scheduled by a first base station, and the data on the second carrier are scheduled by a second base station;

The processor is configured to generate first uplink control information for the first carrier and/or to generate second uplink control information for the second carrier; and to trigger the transceiver to transmit the uplink control information generated by the processor, comprising at least one of the first uplink control information and the second uplink control information, on one uplink carrier according to a preconfigured TA value, and a predefined or preconfigured reference carrier for obtaining uplink transmission time of the user equipment.

In an embodiment of the invention, the one uplink carrier on which the user equipment transmits the uplink control information is:

Only one uplink carrier for transmitting uplink data, configured by the network side for the user equipment; or predefined or preconfigured one of a plurality of uplink carriers for transmitting uplink data, configured by the network side for the user equipment; or an uplink primary component carrier of the user equipment.

In a preferred embodiment, the processor is further configured:

To determine uplink transmission time according to a preconfigured Timing Advance (TA) value, and a predefined or preconfigured reference carrier for obtaining the uplink transmission time; and to trigger the transceiver to transmit the uplink control information at the determined uplink transmission time on the one uplink carrier.

In this embodiment, the processor configured to obtain the TA value and/or the reference carrier is configured:

To receive configuration information transmitted by the first base station, and to obtain the TA value and/or the reference carrier; or To receive configuration information transmitted by the second base station, and to obtain the TA value and/or the reference carrier; or To receive configuration information transmitted by a predefined base station other than the first base station and the second base station, and to obtain the TA value and/or the reference carrier; or To receive configuration information transmitted by a base station scheduling a primary component carrier of the user equipment, and to obtain the TA value and/or the reference carrier; or To receive configuration information transmitted by a base station scheduling the one uplink carrier, and to obtain the TA value and/or the reference carrier; or To receive configuration information transmitted by a base station scheduling transmission of a PUSCH and/or transmission of an SRS on the one uplink carrier, and to obtain the TA value and/or the reference carrier; or To receive configuration information transmitted by a base station scheduling transmission of a PUSCH and/or transmission of an SRS in the current uplink sub-frame, or an uplink sub-frame adjacent to the current sub-frame, on the one uplink carrier, and to obtain the TA value and/or the reference carrier.

In this embodiment, the TA value determined by the processor is:

A first TA value of the user equipment relative to the first base station; or

A TA value obtained by compensating a first TA value of the user equipment relative to the first base station, with respect to a target base station which is a predefined or preconfigured base station other than the first base station; or A second TA value of the user equipment relative to the second base station; or A TA value obtained by compensating a second TA value of the user equipment relative to the second base station, with respect to a target base station which is a predefined or preconfigured base station other than the second base station; or A TA value of the user equipment relative to a predefined base station other than the first base station and the second base station; or A TA value obtained by compensating a TA value of the user equipment relative to a predefined or preconfigured base station other than the first base station and the second base station, with respect to a target base station which is a predefined or preconfigured base station other than the present base station; or A TA value of the user equipment relative to a base station scheduling a downlink primary component carrier of the user equipment; or A TA value of the user equipment relative to the base station scheduling the one uplink carrier; or A TA value for the user equipment to transmit a PUSCH and/or an SRS on the one uplink carrier; or A TA value for the user equipment to transmit a PUSCH and/or an SRS in the current uplink sub-frame, or an uplink sub-frame adjacent to the current frame, on the one uplink carrier; or The average of TA values of the user equipment relative to the respective base stations scheduling data for the user equipment, where the average is predetermined by the respective base stations and notified by one of the respective base stations to the user equipment, or is determined by one of the respective base stations and notified by the base station to the user equipment and the other base stations among the respective base stations; or One of TA values of the user equipment relative to the respective base stations scheduling data for the user equipment, where the TA value is predetermined by the respective base stations and notified by one of the respective base stations to the user equipment, or is determined by one of the respective base stations and notified by the base station to the user equipment and the other base stations among the respective base stations; or A TA value obtained with a predefined optimization method based on TA values of the user equipment relative to the respective base stations scheduling data for the user equipment, where the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations.

In this embodiment, the reference carrier determined by the processor is particularly:

One of downlink carriers scheduled by the first base station; or

One of downlink carriers scheduled by the second base station; or

A downlink primary component carrier of the user equipment; or

A downlink carrier paired with the one uplink carrier; or

One of downlink carriers scheduled by the base station triggering transmission of a PUSCH and/or transmission of an SRS on the one uplink carrier; or One of downlink carriers scheduled by the base station triggering transmission of a PUSCH and/or transmission of an SRS in the current uplink sub-frame, or an uplink sub-frame adjacent to the current sub-frame, on the one uplink carrier; or One of downlink carriers scheduled by a base station other than the first base station and the second base station among the respective base stations scheduling downlink data for the user equipment.

In another preferred embodiment, the processor is configured:

To use a preconfigured first TA value as a TA value for transmitting the first uplink control information, where the first TA value is a TA value of the user equipment relative to the first base station, to use one of downlink carriers scheduled by the first base station or a downlink primary component carrier of the user equipment or a downlink carrier paired with the one uplink carrier as the reference carrier for obtaining the uplink transmission time, to determine uplink transmission time at which the first uplink control information is transmitted, according to the first TA value and the reference carrier, and to trigger the transceiver to transmit the first uplink control information at the determined uplink transmission time on the one uplink carrier; and To use a preconfigured second TA value to the user equipment as a TA value for transmitting the second uplink control information, where the second TA value is a TA value of the user equipment relative to the second base station, to use one of downlink carriers scheduled by the second base station or the downlink primary component carrier of the user equipment or the downlink carrier paired with the one uplink carrier as the reference carrier for obtaining the uplink transmission time of the user equipment, to determine uplink transmission time at which the second uplink control information is transmitted, according to the second TA value and the reference carrier, and to trigger the transceiver to transmit the second uplink control information at the determined uplink transmission time on the one uplink carrier.

In the two preferred embodiments above, the processor configured to obtain the first TA value is configured:

To obtain the first TA value configured by the first base station to the user equipment, through the transceiver, where the first TA value is determined by the first base station according to a received PRACH and/or measurement signal transmitted by the user equipment on the one uplink carrier; or To obtain the first TA value configured by the second base station to the user equipment, through the transceiver, where the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or To obtain the first TA value configured by a predefined or preconfigured base station other than the first base station and the second base station to the user equipment, through the transceiver, where the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier.

In the two preferred embodiments above, the processor configured to obtain the second TA value is configured:

To obtain the second TA value configured by the second base station to the user equipment, through the transceiver, where the second TA value is determined by the second base station according to a received PRACH and/or measurement signal transmitted by the user equipment on the one uplink carrier; or To obtain the second TA value configured by the first base station to the user equipment, through the transceiver, where the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or To obtain the second TA value configured by a predefined or preconfigured base station other than the first base station and the second base station to the user equipment, through the transceiver, where the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

In the first preferred embodiment, the processor is configured:

To trigger the transceiver to transmit a plurality of uplink channels on which the uplink control information generated by the processor is carried, using the same TA value in the same uplink sub-frame on the one uplink carrier; or To trigger the transceiver to transmit at least one uplink channel on which the uplink control information generated by the processor is carried, and at least one uplink channel and/or SRS on and/or in which other information is carried, using the same TA value in the same uplink sub-frame on the one uplink carrier, where uplink control information corresponding to downlink carriers scheduled by the different base stations is carried on the same uplink channel for transmission or carried respectively on different uplink channels for transmission;

Wherein the uplink channel comprises a PUCCH and a PUSCH.

In the second preferred embodiment, the processor is configured:

To trigger the transceiver to transmit uplink control information corresponding to downlink carriers scheduled by the different base stations, respectively using different TA values in different uplink sub-frames on the one uplink carrier, where the uplink channel comprises a PUCCH and a PUSCH.

The structure of and processing by a base station according to an embodiment of the invention will be described below in connection with a hardware structure thereof.

In the embodiment illustrated in FIG. 7, the base station comprises a transceiver, and at least one processor connected with the transceiver, where:

The transceiver is configured to transmit data for a user equipment on a first carrier, where the user equipment is configured with the first carrier and a second carrier, the data on the first carrier are scheduled by the first base station, and data on the second carrier are scheduled by a second base station; and The processor is configured to trigger the transceiver to receive uplink control information transmitted by the user equipment, on one uplink carrier according to a TA value for the user equipment to transmit the uplink control information, and a reference carrier for obtaining uplink transmission time of the user equipment, where the uplink control information comprises at least first uplink control information generated by the user equipment for the first carrier, and the one uplink carrier is used for transmitting uplink control information corresponding to the respective base stations scheduling data for the user equipment.

In an embodiment, the processor is configured:

To determine the TA value for the user equipment to transmit the uplink control information, and the reference carrier for obtaining the uplink transmission time of the user equipment; to determine a reception time window according to the determined TA value and reference carrier; and to receive the uplink control information in the determined reception time window on the one uplink carrier.

In an embodiment of the invention, the processor configured to determine the TA value for the user equipment to transmit the uplink control information is configured:

To determine the TA value for the user equipment to transmit the uplink control information according to a received PRACH and/or measurement signal transmitted by the user equipment on the one uplink carrier; or To obtain the TA value for the user equipment to transmit the uplink control information by compensating a TA value determined according to a received PRACH and/or measurement signal transmitted by the user equipment on the one uplink carrier, with respect to a target base station which is a predefined or preconfigured base station other than the present base station; or To obtain the TA value for the user equipment to transmit the uplink control information according to received information transmitted by any other base station scheduling data for the user equipment than the present base station, where the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the base station; or the TA value is a TA value determined by the other base station according to a predetermined rule, where the other base station includes at least the base station scheduling the data on the second carrier, a base station scheduling a downlink primary component carrier of the user equipment, a base station scheduling the one uplink carrier, a base station triggering transmission of a PUSCH and/or transmission of an SRS on the one uplink carrier, and a base station triggering transmission of a PUSCH and/or transmission of an SRS, in the current uplink sub-frame, or an uplink sub-frame adjacent to the current sub-frame, on the one uplink carrier; or To determine the TA value for the user equipment to transmit the uplink control information according to a predetermined rule;

Wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

Preferably the processor is configured:

To compensate the TA value of the present base station according to at least one of a relative position, a frequency characteristic, and a transmission delay, between the present base station and a corresponding target base station.

Preferably the transceiver is further configured:

To notify the user equipment of the TA value for the user equipment to transmit the uplink control information, determined by the processor; and/or To notify the other base stations scheduling data for the user equipment than the present base station, of the TA value for the user equipment to transmit the uplink control information, determined by the processor.

In an embodiment of the invention, the reference carrier for the user equipment to transmit the uplink control information, determined by the processor is:

One of downlink carriers scheduled by the present base station; or

One of downlink carriers scheduled by the second base station; or

A downlink primary component carrier of the user equipment; or

A downlink carrier paired with the one uplink carrier; or

One of downlink carriers scheduled by a base station triggering transmission of a PUSCH and/or transmission of an SRS on the one uplink carrier; or One of downlink carriers scheduled by a base station triggering transmission of a PUSCH and/or transmission of an SRS, in the current uplink sub-frame, or an uplink sub-frame adjacent to the current sub-frame, on the one uplink carrier; or One of downlink carriers scheduled by a base station other than the present base station and the second base station among the respective base stations scheduling downlink data for the user equipment.

Preferably the transceiver is further configured:

To notify the user equipment of the reference carrier for the user equipment to transmit the uplink control information, determined by the processor; and/or To notify the other base stations scheduling data for the user equipment than the present base station, of the reference carrier for the user equipment to transmit the uplink control information, determined by the processor.

The base station according to the embodiments of the invention can receive the uplink control information generated by the user equipment for downlink carriers scheduled by the different base stations scheduling data for the user equipment, on the one uplink carrier, so that the uplink control information can be fed back in a timely manner while lowering the cost of the user equipment.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting uplink control information, the method comprising:

receiving, by a user equipment, data on a first carrier, and receiving data on a second carrier, wherein the data on the first carrier are scheduled by a first base station, and the data on the second carrier are scheduled by a second base station;

generating, by the user equipment, first uplink control information for the first carrier and/or generating, by the user equipment, second uplink control information for the second carrier; and transmitting, by the user equipment, the uplink control information generated by the user equipment, comprising at least one of the first uplink control information and the second uplink control information, on one uplink carrier according to a Timing Advance (TA) value, and a reference carrier for obtaining uplink transmission time of the user equipment;

wherein transmitting, by the user equipment, the uplink control information on the one uplink carrier comprises:

transmitting, by the user equipment, the first uplink control information on the one uplink carrier according to the TA value and the reference carrier comprises:
using, by the user equipment, a first TA value preconfigured to the user equipment as a TA value for transmitting the first uplink control information, wherein the first TA value is a TA value of the user equipment relative to the first base station, using one of downlink carriers scheduled by the first base station or a downlink primary component carrier of the user equipment or a downlink carrier paired with the one uplink carrier as the reference carrier for obtaining the uplink transmission time of the user equipment, determining uplink transmission time at which the first uplink control information is transmitted, according to the first TA value and the reference carrier, and transmitting the first uplink control information at the determined uplink transmission time on the one uplink carrier; and
transmitting, by the user equipment, the second uplink control information on the one uplink carrier according to the TA value and the reference carrier comprises:
using, by the user equipment, a second TA value preconfigured to the user equipment as a TA value for transmitting the second uplink control information, wherein the second TA value is a TA value of the user equipment relative to the second base station, using one of downlink carriers scheduled by the second base station or the downlink primary component carrier of the user equipment or the downlink carrier paired with the one uplink carrier as the reference carrier for obtaining the uplink transmission time of the user equipment, determining uplink transmission time at which the second uplink control information is transmitted, according to the second TA value and the reference carrier, and transmitting the second uplink control information at the determined uplink transmission time on the one uplink carrier; or
transmitting, by the user equipment, a plurality of uplink channels on which the uplink control information is carried, using the same TA value in the same uplink sub-frame on the one uplink carrier, wherein uplink control information corresponding to downlink carriers scheduled by the different base stations is carried on the different uplink channels for transmission; or
transmitting, by the user equipment, at least one uplink channel on which the uplink control information is carried, and at least one uplink channel in which other information is carried and/or SRS, using the same TA value in the same uplink sub-frame on the one uplink carrier, wherein uplink control information corresponding to downlink carriers scheduled by the different base stations is carried on the same uplink channel for transmission or carried respectively on different uplink channels for transmission; or
transmitting, by the user equipment, uplink control information corresponding to downlink carriers scheduled by the different base stations, respectively using different TA values in different uplink sub-frames on the one uplink carrier;
wherein the uplink channel comprises a Physical Uplink Control Channel (PUCCH) and a PUSCH.

2. The method according to claim 1, wherein transmitting, by the user equipment, the uplink control information on the one uplink carrier according to the TA value and the reference carrier comprises:
determining, by the user equipment, the uplink transmission time of the user equipment according to a preconfigured TA value, and a predefined or preconfigured reference carrier for obtaining the uplink transmission time; and
transmitting, by the user equipment, the uplink control information at the uplink transmission time on the one uplink carrier.

3. The method according to claim 2, wherein obtaining, by the user equipment, the TA value and/or the reference carrier comprises:
receiving, by the user equipment, configuration information transmitted by the first base station, and obtaining the TA value and/or the reference carrier; or
receiving, by the user equipment, configuration information transmitted by the second base station, and obtaining the TA value and/or the reference carrier; or
receiving, by the user equipment, configuration information transmitted by a predefined base station other than the first base station and the second base station, and obtaining the TA value and/or the reference carrier; or
receiving, by the user equipment, configuration information transmitted by a base station scheduling a primary component carrier of the user equipment, and obtaining the TA value and/or the reference carrier; or
receiving, by the user equipment, configuration information transmitted by a base station scheduling the one uplink carrier, and obtaining the TA value and/or the reference carrier; or
receiving, by the user equipment, configuration information transmitted by a base station scheduling transmission of a Physical Uplink Shared Channel (PUSCH) and/or transmission of a Sounding Reference Symbol (SRS) on the one uplink carrier, and obtaining the TA value and/or the reference carrier; or
receiving, by the user equipment, configuration information transmitted by a base station scheduling transmission of a PUSCH and/or transmission of a SRS in the current uplink sub-frame, or an uplink sub-frame adjacent to the current sub-frame, on the one uplink carrier, and obtaining the TA value and/or the reference carrier.

4. The method according to claim 3, wherein the TA value is:
the first TA value of the user equipment relative to the first base station; or
a TA value obtained by compensating the first TA value of the user equipment relative to the first base station, with respect to a target base station which is a predefined or preconfigured base station other than the first base station; or
the second TA value of the user equipment relative to the second base station; or
a TA value obtained by compensating the second TA value of the user equipment relative to the second base station, with respect to a target base station which is a predefined or preconfigured base station other than the second base station; or
a TA value of the user equipment relative to a predefined base station other than the first base station and the second base station; or
a TA value obtained by compensating a TA value of the user equipment relative to a predefined or preconfigured base station other than the first base station and the second base station, with respect to a target base station which is a predefined or preconfigured base station other than the present base station; or
a TA value of the user equipment relative to a base station scheduling a downlink primary component carrier of the user equipment; or a TA value of the user equipment relative to the base station scheduling the one uplink carrier; or a TA value for the user equipment to transmit a PUSCH and/or a SRS on the one uplink carrier; or a TA value for the user equipment to transmit a PUSCH and/or an SRS in the current uplink sub-frame, or an uplink sub-frame adjacent to the current frame, on the one uplink carrier; or the average of TA values of the user equipment relative to the respective base stations scheduling data for the user equipment, wherein the average is predetermined by the respective base stations and notified by one of the respective base stations to the user equipment, or is determined by one of the respective base stations and notified by the base station to the user equipment and the other base stations among the respective base stations; or one of TA values of the user equipment relative to the respective base stations scheduling data for the user equipment, wherein the TA value is predetermined by the respective base stations and notified by one of the respective base stations to the user equipment, or is determined by one of the respective base stations and notified by the base station to the user equipment and the other base stations among the respective base stations; or a TA value obtained with a predefined optimization method based on TA values of the user equipment relative to the respective base stations scheduling data for the user equipment, wherein the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations;

and/or wherein the reference carrier is:

one of downlink carriers scheduled by the first base station; or one of downlink carriers scheduled by the second base station; or a downlink primary component carrier of the user equipment; or a downlink carrier paired with the one uplink carrier; or one of downlink carriers scheduled by a base station triggering transmission of a PUSCH and/or transmission of an SRS on the one uplink carrier; or one of downlink carriers scheduled by a base station triggering transmission of a PUSCH and/or transmission of an SRS in the current uplink sub-frame, or an uplink sub-frame adjacent to the current sub-frame, on the one uplink carrier; or one of downlink carriers scheduled by a base station other than the first base station and the second base station among the respective base stations scheduling downlink data for the user equipment.

5. The method according to claim 1, wherein obtaining, by the user equipment, the first TA value comprises:

obtaining, by the user equipment, the first TA value configured by the first base station to the user equipment, wherein the first TA value is determined by the first base station according to a received Physical Random Access Channel (PRACH) and/or measurement signal transmitted by the user equipment on the one uplink carrier; or obtaining, by the user equipment, the first TA value configured by the second base station to the user equipment, wherein the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or obtaining, by the user equipment, the first TA value configured by a predefined or preconfigured base station other than the first base station and the second base station to the user equipment, wherein the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier;

and/or obtaining, by the user equipment, the second TA value comprises:

obtaining, by the user equipment, the second TA value configured by the second base station to the user equipment, wherein the second TA value is determined by the second base station according to a received PRACH and/or measurement signal transmitted by the user equipment on the one uplink carrier; or obtaining, by the user equipment, the second TA value configured by the first base station to the user equipment, wherein the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or obtaining, by the user equipment, the second TA value configured by a predefined or preconfigured base station other than the first base station and the second base station to the user equipment, wherein the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

6. A method for receiving uplink control information, the method comprising:

transmitting, by a first base station, data for a user equipment on a first carrier, wherein the user equipment is configured with the first carrier and a second carrier, the data on the first carrier are scheduled by the first base station, and data on the second carrier are scheduled by a second base station; and receiving, by the first base station, uplink control information transmitted by the user equipment, on one uplink carrier according to a TA value for the user equipment to transmit the uplink control information, and a reference carrier for obtaining uplink transmission time of the user equipment, wherein the uplink control information comprises at least first uplink control information generated by the user equipment for the first carrier, and the one uplink carrier is used for transmitting uplink control information corresponding to the respective base stations scheduling data for the user equipment;

wherein receiving, by the first base station, the uplink control information transmitted by the user equipment, on one uplink carrier according to the TA value and the reference carrier comprises:

determining, by the first base station, the TA value for the user equipment to transmit the uplink control information, and the reference carrier for obtaining the uplink transmission time of the user equipment;

determining, by the first base station, a reception time window according to the TA value and the reference carrier; and receiving, by the first base station, the uplink control information in the reception time window on the one uplink carrier;

wherein, the first base station and the second base station receive the same uplink channel on which the uplink control information is carried, respectively in their respective determined reception time windows in the same uplink sub-frame on the one uplink carrier, wherein the uplink control information comprises at least the first uplink control information and second uplink control information generated by the user equipment for the second carrier; or the first base station receives an uplink channel on which the first uplink control information is carried, and the second base station receives an uplink channel on which the second uplink control information is carried, respectively in their respective determined reception time windows in the same uplink sub-frame on the one uplink carrier, wherein the uplink channel on which the first uplink control information is carried is different from the uplink channel on which the second uplink control information is carried; or the first base station receives an uplink channel on which the first uplink control information is carried, and the second base station receives an uplink channel on which the second uplink control information is carried, respectively in their respective determined reception time windows in different uplink sub-fames on the one uplink carrier.

7. The method according to claim 6, wherein determining, by the first base station, the TA value for the user equipment to transmit the uplink control information comprises:

determining, by the first base station, the TA value according to a received Physical Random Access Channel (PRACH) and/or measurement signal transmitted by the user equipment on the one uplink carrier; or obtaining, by the first base station, the TA value by compensating a TA value determined according to a received PRACH and/or measurement signal transmitted by the user equipment on the one uplink carrier, with respect to a target base station which is a predefined or preconfigured base station other than the first base station; or obtaining, by the first base station, the TA value according to received information transmitted by any other base station scheduling data for the user equipment than the present base station, wherein the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the first base station; or the TA value is a TA value determined by the other base station according to a predetermined rule, wherein the other base station comprises at least the second base station, a base station scheduling a downlink primary component carrier of the user equipment, a base station scheduling the one uplink carrier, a base station triggering transmission of a Physical Uplink Shared Channel (PUSCH) and/or transmission of a Sounding Reference Symbol (SRS) on the one uplink carrier, and a base station triggering transmission of a PUSCH and/or transmission of an SRS, in the current uplink sub-frame, or an uplink sub-frame adjacent to the current sub-frame, on the one uplink carrier; or determining, by the first base station, the TA value according to a predetermined rule;

wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

8. The method according to claim 7, wherein the method further comprises:

compensating, by the first base station, with respect to the target base station the TA value determined by the first base station according to the received PRACH and/or measurement signal transmitted by the user equipment on the one uplink carrier, according to at least one of a relative position, a frequency characteristic, and a transmission delay, between the first base station and the corresponding target base station;

and/or compensating, by the other base station, with respect to the target base station the TA value determined by the other base station according to the received PRACH and/or measurement signal transmitted by the user equipment on the one uplink carrier, according to at least one of a relative position, a frequency characteristic, and a transmission delay, between the other base station and the corresponding target base station.

9. The method according to claim 6, wherein before the first base station receives the uplink control information transmitted by the user equipment, on the one uplink carrier, the method further comprises:

notifying, by the first base station, the user equipment of the TA value and/or the reference carrier for the user equipment to transmit the uplink control information; and/or notifying, by the first base station, the other base stations scheduling data for the user equipment than the present base station, of the TA value and/or the reference carrier for the user equipment to transmit the uplink control information.

10. The method according to claim 6, wherein the reference carrier is:
one of downlink carriers scheduled by the first base station; or
one of downlink carriers scheduled by the second base station; or
a downlink primary component carrier of the user equipment; or
a downlink carrier paired with the one uplink carrier; or
one of downlink carriers scheduled by a base station triggering transmission of a PUSCH and/or transmission of an SRS on the one uplink carrier; or
one of downlink carriers scheduled by a base station triggering transmission of a PUSCH and/or transmission of an SRS, in the current uplink sub-frame, or an uplink sub-frame adjacent to the current sub-frame, on the one uplink carrier; or
one of downlink carriers scheduled by a base station other than the first base station and the second base station among the respective base stations scheduling downlink data for the user equipment.

11. A user equipment, comprising:
a transceiver;
a processor; and
a memory storing at least one instruction ,wherein the processor is configured to execute the at least one instruction to:
control the transceiver to receive data on a first carrier and to receive data on a second carrier, wherein the data on the first carrier are scheduled by a first base station, and the data on the second carrier are scheduled by a second base station;
generate first uplink control information for the first carrier and/or generate second uplink control information for the second carrier; and
control the transceiver to transmit uplink control information generated by the processor, comprising at least one of the first uplink control information and the second uplink control information, on one uplink carrier according to a Timing Advance (TA) value, and a reference carrier for obtaining uplink transmission time of the user equipment;
wherein the processor is configured to execute the at least one instruction to:
use a preconfigured first TA value as a TA value for transmitting the first uplink control information, wherein the first TA value is a TA value of the user equipment relative to the first base station, use one of downlink carriers scheduled by the first base station or a downlink primary component carrier of the user equipment or a downlink carrier paired with the one uplink carrier as the reference carrier for obtaining the uplink transmission time, determine uplink transmission time at which the first uplink control information is transmitted, according to the first TA value and the reference carrier, and control the transceiver to transmit the first uplink control information at the determined uplink transmission time on the one uplink carrier; and
use a preconfigured second TA value as a TA value for transmitting the second uplink control information, wherein the second TA value is a TA value of the user equipment relative to the second base station, use one of downlink carriers scheduled by the second base station or the downlink primary component carrier of the user equipment or the downlink carrier paired with the one uplink carrier as the reference carrier for obtaining the uplink transmission time of the user equipment, determine uplink transmission time at which the second uplink control information is transmitted, according to the second TA value and the reference carrier, and control the transceiver to transmit the second uplink control information at the determined uplink transmission time on the one uplink carrier; or
control the transceiver to transmit a plurality of uplink channels on which the uplink control information is carried, using the same TA value in the same uplink sub-frame on the one uplink carrier, wherein uplink control information corresponding to downlink carriers scheduled by the different base stations is carried on the different uplink channels for transmission; or
control the transceiver to transmit at least one uplink channel on which the uplink control information is carried, and at least one uplink channel and/or SRS on and/or in which other information is carried, using the same TA value in the same uplink sub-frame on the one uplink carrier, wherein uplink control information corresponding to downlink carriers scheduled by the different base stations is carried on the same uplink channel for transmission or carried respectively on different uplink channels for transmission; or
control the transceiver to transmit uplink control information corresponding to downlink carriers scheduled by the different base stations, respectively using different TA values in different uplink sub-frames on the one uplink carrier;
wherein the uplink channel comprises a Physical Uplink Control Channel (PUCCH) and a PUSCH.

12. The user equipment according to claim 11, wherein the processor is configured to execute the at least one instruction to:
determine uplink transmission time according to the TA value, and the reference carrier for obtaining the uplink transmission time; and control the transceiver to transmit the uplink control information at the uplink transmission time on the one uplink carrier.

13. The user equipment according to claim 12, wherein the processor is configured to execute the at least one instruction to
control the transceiver to receive configuration information transmitted by the first base station, and obtain the TA value and/or the reference carrier; or
control the transceiver to receive configuration information transmitted by the second base station, and obtain the TA value and/or the reference carrier; or
control the transceiver to receive configuration information transmitted by a predefined base station other than the first base station and the second base station, and obtain the TA value and/or the reference carrier; or
control the transceiver to receive configuration information transmitted by a base station scheduling a primary component carrier of the user equipment, and obtain the TA value and/or the reference carrier; or
control the transceiver to receive configuration information transmitted by a base station scheduling the one uplink carrier, and obtain the TA value and/or the reference carrier; or
control the transceiver to receive configuration information transmitted by a base station scheduling transmission of a PUSCH and/or transmission of an SRS on the one uplink carrier, and obtain the TA value and/or the reference carrier; or control the transceiver to receive configuration information transmitted by a base station scheduling transmission of a PUSCH and/or transmission of an SRS in the current uplink sub-frame, or an uplink sub-frame adjacent to the current sub-frame, on the one uplink carrier, and obtain the TA value and/or the reference carrier.

14. The user equipment according to claim 13, wherein the TA value is:
the first TA value of the user equipment relative to the first base station; or
a TA value obtained by compensating the first TA value of the user equipment relative to the first base station, with respect to a target base station which is a predefined or preconfigured base station other than the first base station; or
the second TA value of the user equipment relative to the second base station; or
a TA value obtained by compensating the second TA value of the user equipment relative to the second base station, with respect to a target base station which is a predefined or preconfigured base station other than the second base station; or
a TA value of the user equipment relative to a predefined base station other than the first base station and the second base station; or
a TA value obtained by compensating a TA value of the user equipment relative to a predefined or preconfigured base station other than the first base station and the second base station, with respect to a target base station which is a predefined or preconfigured base station other than the present base station; or
a TA value of the user equipment relative to a base station scheduling a downlink primary component carrier of the user equipment; or
a TA value of the user equipment relative to the base station scheduling the one uplink carrier; or
a TA value for the user equipment to transmit a PUSCH and/or an SRS on the one uplink carrier; or
a TA value for the user equipment to transmit a PUSCH and/or an SRS in the current uplink sub-frame, or an uplink sub-frame adjacent to the current frame, on the one uplink carrier; or
the average of TA values of the user equipment relative to the respective base stations scheduling data for the user equipment, wherein the average is predetermined by the respective base stations and notified by one of the respective base stations to the user equipment, or is determined by one of the respective base stations and notified by the base station to the user equipment and the other base stations among the respective base stations; or
one of TA values of the user equipment relative to the respective base stations scheduling data for the user equipment, wherein the TA value is predetermined by the respective base stations and notified by one of the respective base stations to the user equipment, or is determined by one of the respective base stations and notified by the base station to the user equipment and the other base stations among the respective base stations; or
a TA value obtained with a predefined optimization method based on TA values of the user equipment relative to the respective base stations scheduling data for the user equipment, wherein the TA value is predetermined by the respective base stations using the predefined optimization method and notified by one of the respective base stations to the user equipment, or is predetermined by one of the respective base stations using the predefined optimization method and notified by the base station to the user equipment and the other base stations among the respective base stations;
and/or
wherein the reference carrier is:
one of downlink carriers scheduled by the first base station; or
one of downlink carriers scheduled by the second base station; or
a downlink primary component carrier of the user equipment; or
a downlink carrier paired with the one uplink carrier; or
one of downlink carriers scheduled by a base station triggering transmission of a PUSCH and/or transmission of an SRS on the one uplink carrier; or
one of downlink carriers scheduled by a base station triggering transmission of a PUSCH and/or transmission of an SRS in the current uplink sub-frame, or an uplink sub-frame adjacent to the current sub-frame, on the one uplink carrier; or
one of downlink carriers scheduled by a base station other than the first base station and the second base station among the respective base stations scheduling downlink data for the user equipment.

15. The user equipment according to claim 11, wherein the processor is configured to execute the at least one instruction to
obtain the first TA value configured by the first base station to the user equipment, through the transceiver, wherein the first TA value is determined by the first base station according to a received Physical Random Access Channel (PRACH) and/or measurement signal transmitted by the user equipment on the one uplink carrier; or obtain the first TA value configured by the second base station to the user equipment, through the transceiver, wherein the first TA value is determined by the first base station according to a received PRACH and/or measurement signal transmitted by the user equipment on the one uplink carrier and then notified in advance to the second base station, or is obtained by the second base station by compensating with respect to the first base station a TA value determined according to a received PRACH and/or measurement signal transmitted by the user equipment on the one uplink carrier; or obtain the first TA value configured by a predefined or preconfigured base station other than the first base station and the second base station to the user equipment, through the transceiver, wherein the first TA value is determined by the first base station according to a received PRACH and/or measurement signal transmitted by the user equipment on the one uplink carrier and then notified in advance to the predefined or preconfigured base station, or is obtained by the predefined or preconfigured base station by compensating with respect to the first base station a TA value determined according to a received PRACH and/or measurement signal transmitted by the user equipment on the one uplink carrier;
and/or
the processor is configured to execute the at least one instruction to
obtain the second TA value configured by the second base station to the user equipment, through the transceiver, wherein the second TA value is determined by the second base station according to a received PRACH and/or measurement signal transmitted by the user equipment on the one uplink carrier; or obtain the second TA value configured by the first base station to the user equipment, through the transceiver, wherein the second TA value is determined by the second base station according to a received PRACH and/or measurement signal transmitted by the user equipment on the one uplink carrier and then notified in advance to the first base station, or is obtained by the first base station by compensating with respect to the second base station a TA value determined according to a received PRACH and/or measurement signal transmitted by the user equipment on the one uplink carrier; or obtain the second TA value configured by a predefined or preconfigured base station other than the first base station and the second base station to the user equipment, through the transceiver, wherein the second TA value is determined by the second base station according to a received PRACH and/or measurement signal transmitted by the user equipment on the one uplink carrier and then notified in advance to the predefined or preconfigured base station, or is obtained by the predefined or preconfigured base station by compensating with respect to the second base station a TA value determined according to a received PRACH and/or measurement signal transmitted by the user equipment on the one uplink carrier.

16. A base station, comprising:
a transceiver;
a processor; and
a memory storing at least one instruction ,wherein the processor is configured to execute the at least one instruction to:
control the transceiver to transmit data for a user equipment on a first carrier, wherein the user equipment is configured with the first carrier and a second carrier, the data on the first carrier are scheduled by the base station, and data on the second carrier are scheduled by a second base station; and
control the transceiver to receive uplink control information transmitted by the user equipment, on one uplink carrier according to a TA value for the user equipment to transmit the uplink control information, and a reference carrier for obtaining uplink transmission time of the user equipment, wherein the uplink control information comprises at least first uplink control information generated by the user equipment for the first carrier, and the one uplink carrier is used for transmitting uplink control information corresponding to the respective base stations scheduling data for the user equipment;
wherein the processor is configured to execute the at least one instruction to:
determine the TA value for the user equipment to transmit the uplink control information and the reference carrier for obtaining the uplink transmission time of the user equipment;
determine a reception time window according to the TA value and the reference carrier; and
control the transceiver to receive the uplink control information in the reception time window on the one uplink carrier;
wherein,
the base station and the second base station receive the same uplink channel on which the uplink control information is carried, respectively in their respective determined reception time windows in the same uplink sub-frame on the one uplink carrier, wherein the uplink control information comprises at least the first uplink control information and second uplink control information generated by the user equipment for the second carrier; or
the base station receives an uplink channel on which the first uplink control information is carried, and the second base station receives an uplink channel on which the second uplink control information is carried, respectively in their respective determined reception time windows in the same uplink sub-frame on the one uplink carrier, wherein the uplink channel on which the first uplink control information is carried is different from the uplink channel on which the second uplink control information is carried; or
the base station receives an uplink channel on which the first uplink control information is carried, and the second base station receives an uplink channel on which the second uplink control information is carried, respectively in their respective determined reception time windows in different uplink sub-fames on the one uplink carrier.

17. The base station according to claim 16, wherein the processor is configured to execute the at least one instruction to:
determine the TA value according to a received Physical Random Access Channel (PRACH) and/or measurement signal transmitted by the user equipment on the one uplink carrier; or
obtain the TA value by compensating a TA value determined according to a received PRACH and/or measurement signal transmitted by the user equipment on the one uplink carrier, with respect to a target base station which is a predefined or preconfigured base station other than the present base station; or
obtain the TA value according to received information transmitted by any other base station scheduling data for the user equipment than the present base station, wherein the TA value is a TA value determined by the other base station according to a received PRACH and/or measurement signal transmitted by the user equipment on the one uplink carrier, or the TA value is a TA value obtained by the other base station by compensating a TA value determined according to a received PRACH and/or measurement signal transmitted by the user equipment on the one uplink carrier, with respect to a target base station which is a predefined or preconfigured base station other than the present base station and the base station; or the TA value is a TA value determined by the other base station according to a predetermined rule, wherein the other base station comprises at least the base station scheduling the data on the second carrier, a base station scheduling a downlink primary component carrier of the user equipment, a base station scheduling the one uplink carrier, a base station triggering transmission of a PUSCH and/or transmission of an SRS on the one uplink carrier, and a base station triggering transmission of a PUSCH and/or transmission of an SRS, in the current uplink sub-frame, or an uplink sub-frame adjacent to the current sub-frame, on the one uplink carrier; or
determine the TA value according to a predetermined rule;
wherein the predetermined rule is to average TA values of the user equipment relative to the respective base stations scheduling data for the user equipment, or to predefine one of TA values of the user equipment relative to the respective base stations scheduling data for the user equipment, or to optimize TA values of the user equipment relative to the respective base stations scheduling data for the user equipment into a TA value using the predefined optimization method.

18. The base station according to claim 17, wherein the processor is configured to execute the at least one instruction to
compensate the TA value of the present base station according to at least one of a relative position, a frequency characteristic, and a transmission delay, between the present base station and a corresponding target base station.

19. The base station according to claim 16, wherein the processor is configured to execute the at least one instruction to
control the transceiver to notify the user equipment of the TA value and/or the reference carrier for the user equipment to transmit the uplink control information; and/or
control the transceiver to notify the other base stations scheduling data for the user equipment than the present base station, of the TA value and/or the reference carrier for the user equipment to transmit the uplink control information.

20. The base station according to claim 16, wherein the reference carrier is:
one of downlink carriers scheduled by the base station; or
one of downlink carriers scheduled by the second base station; or
a downlink primary component carrier of the user equipment; or
a downlink carrier paired with the one uplink carrier; or
one of downlink carriers scheduled by a base station triggering transmission of a PUSCH and/or transmission of an SRS on the one uplink carrier; or
one of downlink carriers scheduled by a base station triggering transmission of a PUSCH and/or transmission of an SRS, in the current uplink sub-frame, or an uplink sub-frame adjacent to the current sub-frame, on the one uplink carrier; or
one of downlink carriers scheduled by a base station other than the base station and the second base station among the respective base stations scheduling downlink data for the user equipment.

* * * * *